(12) United States Patent
Wu

(10) Patent No.: US 8,055,585 B2
(45) Date of Patent: Nov. 8, 2011

(54) DIGITAL MEDIA DISTRIBUTION

(75) Inventor: Bo Wu, San Jose, CA (US)

(73) Assignee: Enreach Technology, Inc., San Jose, CA (US)

( * ) Notice: Subject to any disclaimer, the term of this patent is extended or adjusted under 35 U.S.C. 154(b) by 1263 days.

(21) Appl. No.: 10/917,731

(22) Filed: Aug. 12, 2004

(65) Prior Publication Data

US 2006/0036549 A1 Feb. 16, 2006

(51) Int. Cl.
G06F 21/00 (2006.01)
(52) U.S. Cl. .......................................... 705/51; 235/381
(58) Field of Classification Search ...................... 705/50
See application file for complete search history.

(56) References Cited

U.S. PATENT DOCUMENTS

| | | | |
|---|---|---|---|
| 4,949,257 A * | 8/1990 | Orbach | 705/21 |
| 5,159,560 A * | 10/1992 | Newell et al. | 700/215 |
| 5,638,985 A * | 6/1997 | Fitzgerald et al. | 221/125 |
| 5,734,719 A * | 3/1998 | Tsevdos et al. | 700/234 |
| 5,909,638 A * | 6/1999 | Allen | 725/146 |
| 5,926,624 A * | 7/1999 | Katz et al. | 709/217 |
| 6,170,060 B1 * | 1/2001 | Mott et al. | 726/29 |
| 6,195,694 B1 * | 2/2001 | Chen et al. | 709/220 |
| 6,286,029 B1 * | 9/2001 | Delph | 709/203 |
| 6,367,019 B1 * | 4/2002 | Ansell et al. | 726/26 |
| 6,560,651 B2 * | 5/2003 | Katz et al. | 709/229 |
| 6,655,590 B1 * | 12/2003 | McFeely et al. | 235/451 |
| 6,671,726 B1 * | 12/2003 | Hanway | 709/227 |
| 6,697,944 B1 * | 2/2004 | Jones et al. | 713/168 |
| 6,757,683 B2 * | 6/2004 | Goodwin et al. | 707/10 |
| 7,599,855 B2 * | 10/2009 | Sussman | 705/26 |
| 2003/0084306 A1 * | 5/2003 | Abburi et al. | 713/188 |

* cited by examiner

Primary Examiner — Jamie Kucab

(57) ABSTRACT

One embodiment in accordance with the invention is a method. For example, the method includes storing movie content with a distribution station that can be subsequently purchased and/or rented. The movie content can be encrypted. A determination can be made as to whether a storage apparatus is coupled with the distribution station. Provided the storage apparatus has been coupled with the distribution station, a determination can be made as to whether the storage apparatus is authorized to receive the movie content. Provided the storage apparatus is authorized to receive the movie content, encrypted movie content can be downloaded to the storage apparatus from the distribution station. Note that the download of movie content to the authorized storage apparatus can be part of a purchase and/or rental transaction.

24 Claims, 11 Drawing Sheets

DIGITAL MEDIA DISTRIBUTION

BACKGROUND

The Internet enables computer users to conveniently purchase items from the comfort of their homes, offices, or wherever a computer can be communicatively connected to the Internet. Items that can be purchased via the Internet can include airline tickets, books, compact discs (CDs), car rental, sporting equipment, DVDs, hotel room booking, concert tickets, to name a few. Additionally, when a computer is connected to the Internet, its user is capable of purchasing and downloading music to their computer where it can be stored for subsequent use and/or transfer to another device. It is noted that when the computer is connected to the Internet utilizing a 56 Kbps (kilobits per second) modem, the download of a single song can typically take up to 15 to 20 minutes. On the other hand, when the computer is connected to the Internet utilizing a broadband modem, the download of a single song can take less than a minute. Alternatively, when a computer is connected to the Internet, its user is capable of purchasing and downloading movies to the computer for subsequent use. However, there are disadvantages associated with acquiring movies in this manner.

For example, one of the disadvantages associated with downloading movies from the Internet is that it typically takes a much greater amount of time (even using a broadband modem) to transfer all of the data associated with a movie when compared with the transfer time of a single song. Additionally, the transfer time it takes to download a high-definition (HD) movie takes even longer than the transfer time of a typically formatted movie since a HD movie involves so much more data.

Another disadvantage associated with downloading movies from the Internet is that the communication equipment of Internet service providers (ISPs), that provide computers access to the Internet, can become bogged down from the continual data transfer that can be involved with downloading movie content to many computers. Therefore, it can be cumbersome and taxing to ISP communication equipment to support the downloading movie content from the Internet.

The invention may address one or more of the above issues.

SUMMARY

One embodiment in accordance with the invention is a method. For example, the method includes storing movie content with a distribution station that can be subsequently purchased and/or rented. The movie content can be encrypted. A determination can be made as to whether a storage apparatus is coupled with the distribution station. Provided the storage apparatus has been coupled with the distribution station, a determination can be made as to whether the storage apparatus is authorized to receive the movie content. Provided the storage apparatus is authorized to receive the movie content, encrypted movie content can be downloaded to the storage apparatus from the distribution station. Note that the download of movie content to the authorized storage apparatus can be part of a purchase and/or rental transaction.

While a particular embodiment of the present invention has been specifically described within this summary, it is noted that the invention is not limited to this embodiment. The invention is intended to cover alternatives, modifications and equivalents which may be included within the scope of the invention as defined by the Claims.

DETAILED DESCRIPTION

Reference will now be made in detail to embodiments in accordance with the invention, examples of which are illustrated in the accompanying drawings. While the invention will be described in conjunction with embodiments, it will be understood that these embodiments are not intended to limit the invention. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, logic blocks, processing, and other symbolic representations of operations on data bits within a computing system or digital system memory. These descriptions and representations are the means used by those skilled in the art to most effectively convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or similar electronic computing device.

Unless specifically stated otherwise as apparent from the following discussions, it is understood that throughout discussions of the present invention, discussions utilizing terms such as "storing", "encrypting", "determining", "transmitting", "downloading", "receiving", "generating", "creating", "utilizing", "enabling", "collecting", "disallowing", "restricting", "deleting" or the like, can refer to the action and processes of a computing system, or similar electronic computing device, that manipulates and transforms data. The data can be represented as physical (electronic) quantities within the computing system's registers and memories and can be transformed into other data similarly represented as physical quantities within the computing system's memories or registers or other such information storage, transmission, or display devices.

Figure 1:
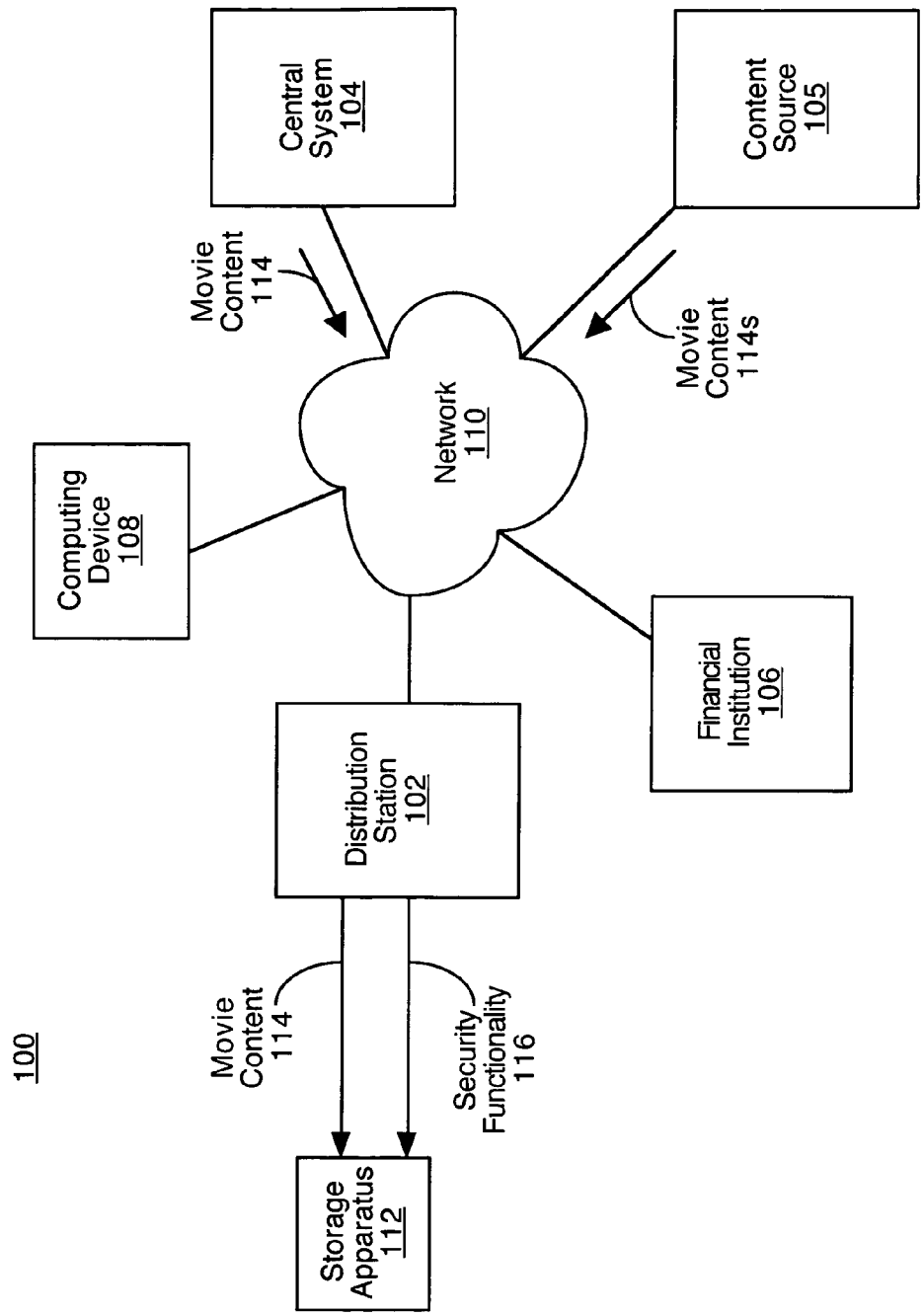
FIG. 1 is a block diagram of an exemplary system for providing movie content to one or more consumers in accordance with embodiments of the invention.

FIG. 1 is a block diagram of an exemplary system 100 for providing movie content (e.g., 114) to one or more consumers in accordance with embodiments of the invention. Specifically, system 100 includes a distribution station 102 that is capable of distributing digital movies to consumers that can be purchased and/or rented, but is not limited to such. Distribution station 102 can be implemented in a wide variety of ways. For example, distribution station 102 can be implemented as a free standing kiosk similar in dimensions to a free standing ATM (automated teller machine) that may be found in a grocery store or other type of business. Additionally, when distribution station 102 is implemented as a free standing kiosk distribution station, it can include a server computer (e.g., 1100 of FIG. 11) having storage capabilities sufficient for storing digital movie content (e.g., 114), such as many digital movies (e.g., 100, 270, 700, or more). Distribution station 102 can be implemented such that it is fully automated (which can eliminate staffing issues) and includes a display device (not shown) for providing an "easy-to-use" consumer interface in the form of, but not limited to, a graphical user interface (GUI). Furthermore, distribution station 102 can be credit card enabled so that a distribution purchase and/or rental do not involve any cash transaction. Moreover, distribution station 102 can be placed in locations that consumers frequent most, such as shopping malls, colleges, grocery stores, convenience stores, business complexes, gas stations, and apartment complexes, to name of few. As such, customers can rent and/or purchase movies in a wide variety of locations, 24 hours a day. It is noted that the used inventory of distribution station 102 can be sold directly to the consumer.

Within system 100, distribution station 102 can be remotely managed (e.g., by one or more owners and/or operators) by a central system 104 via a communication network 110. For example, distribution station 102 can permit the remote managing by central system 104 of its inventory, its pricing, its rental time periods, and review of its sales trends. Furthermore, the remote management capability of central system 104 can also include monitoring the daily usage of distribution station 102, along with monitoring other operating information from a single distribution station level all the way to a complete national summary. Moreover, the remote management capability of content center 104 can include enabling distribution station 102 to launch color, static or full motion advertising for on-screen or overhead display. Note that any movie transaction (e.g., purchase, rental, and the like) that occurs at distribution station 102, can subsequently be reported to central system 104 via network 110. Conversely, any movie transaction (e.g., purchase, rental, and the like) that occurs at or is associated with central system 104 (e.g., via computing device 108) can subsequently be reported to distribution station 102 via network 110. In this manner, the usage data associated with distribution station 102 and central system 104 can be kept current and accurate.

Within FIG. 1, system 100 includes a content source 105 which can provide movie content (e.g., digital and/or analog) 114s to central system 104. Note that the content source 105 can transmit movie content 114s to central system 104 using communication network 110. Alternatively, content source 105 can store movie content 114s onto one or more electronic storage apparatuses (not shown) that can be physically delivered to central system 104. Once movie content 114s is received by central system 104, the movie content 114s can be converted into a digital format, if not already in that format. Note that central system 104 can distribute movie content 114 which may or may not be in a different format than the originally received movie content 114s. The central system 104 can distribute the movie content 114 to distribution station 102 via communication network 110. Alternatively, central system 104 can store the movie content 114 onto one or more electronic storage apparatuses (not shown) that can be physically delivered to the distribution station 102. The movie content 114 can then be downloaded from the electronic storage apparatuses into electronic storage of the distribution station 102. Or the electronic storage apparatuses can be installed or coupled such that distribution station 102 can access the movie content 114 from them.

A consumer can utilize distribution station 102 to purchase and/or rent movie content 114. For example, the customer can couple an electronic storage apparatus or device 112 with distribution station 102. The distribution station 102 can include a user interface enabling the customer to select one or more movies 114 that are to be rented and/or purchased from distribution station 102. Once the movie selection has been completed, distribution station 102 can then collect payment information from the customer regarding the rental and/or purchase transaction. For example, distribution station 102 can include a credit card reader (not shown) capable of reading account information associated with a credit card. Alternatively, the consumer can be queried by distribution station 102 to input their credit card number along with other consumer identification information, such as, their name, home address, telephone number, and any other pertinent information. The distribution station 102 can then submit the credit card number to a financial institution 106 via network 110 in order to receive payment authorization. Note that the submission by the consumer of the consumer identification and payment information can be utilized to create a consumer account usable within system 100.

Within FIG. 1, the payment information collected by distribution station 102 can be in the form of a movie point card. For example, distribution station 102 can include a movie point card reader (not shown) capable of reading account information and point amount associated with a movie point card. Distribution station 102 can verify the movie point card and then deduct the number of points associated with the current movie rental and/or purchase. This transaction can be reported to a central point card system (not shown) that can be implemented as part of central system 104. Alternatively, an electronic movie point "card" can be stored on the electronic storage apparatus 112. As such, once storage apparatus 112 is coupled with distribution station 102, the distribution station 102 can verify the electronic movie point "card" and then deduct the number of points associated with the current movie rental and/or purchase. This transaction can be reported to a central point card system (not shown) that may be implemented as part of central system 104, but is not limited to such.

Note that the movie point cards (physical, electronic, or otherwise) can be purchased in a manner similar to prepaid phone cards where they include a predefined number of movie points for a specified purchase price. Or a movie point card can be purchase and depending on the amount a consumer is willing to spend, an equivalent amount of movie points can be associated with (e.g., stored) the movie point card. In another embodiment, a consumer can use a computing device (e.g., 108) coupled with network 110 to utilize a user interface (e.g., web page) provided by central system 104 for purchasing movie points. For example, the consumer can use the interface via computing device 108 to transmit the consumer's credit card number along with any other requested consumer identification information (e.g., consumer's name, address, phone number, and the like) to central system 104. Once this information is submitted, the consumer can then utilize the interface via computing device 108 to indicate the number of movie points to purchase with the submitted credit card. Note that the submission by the consumer of the consumer identification and payment information can be utilized to create a consumer account usable within system 100.

Within FIG. 1, using computing device 108 and network 110, a consumer can utilize an interface (e.g., web page) provided by central system 104 to specify and provide a user identification (ID) along with a password to central system 104. Note that the user ID and password can be utilized by the consumer at distribution station 102 and when communicating with central system 104 via computing device 108 and network 110. For example, the consumer can subsequently utilize the user ID and password with a user interface provided by central system 104 (or a website) to increase the amount of movie points associated with the consumer's movie point account. Alternatively, the consumer can subsequently utilize the user ID and password with a user interface provided by distribution station 102 to increase the amount of movie points associated with the consumer's point account. In another embodiment, the consumer can utilize the user ID and password with a user interface provided by distribution station 102 to store an electronic movie point "card" onto storage apparatus 112. In yet another embodiment, the consumer can utilize the user ID and password with a user interface provided by distribution station 102 to increase the movie points associated with the electronic movie point "card" stored by storage apparatus 112. Note that any movie point transaction that occurs at distribution station 102 can subsequently be reported to central system 104 via network 110. Conversely, any movie point transaction that occurs at or associated with central system 104 (e.g., via computing device 108) can subsequently be reported to distribution station 102 via network 110. In this manner, the movie point account of each consumer can be kept current and accurate.

Using computing device 108 and network 110, a consumer can utilize a user interface (e.g., web page) provided by central system 104 (or a website) to select movies (e.g., 114) that the consumer desires to purchase and/or rent from a particular distribution station (e.g., 102). As such, the consumer can create (or generate) a movie list of desired movie content 114. Additionally, the web page (or web site) can also include a directory of different locations of distribution stations (e.g., 102) thereby enabling the customer to select the distribution station he or she wants to use to retrieve the selected movie content 114. Note that in the process of interfacing with the web page (or web site) to create the movie list, a login process could have taken place wherein the consumer may have provided his or her pre-established user ID and password.

Within FIG. 1, once the movie list has been completed, diverse operations can be done with it. For example, the consumer can download and store the completed movie list to a storage apparatus (e.g., 112) that is coupled with computing device 108. Subsequently, the consumer can transport the storage apparatus 112 to a distribution station (e.g., 102). Then the consumer can couple the storage apparatus 112 with the distribution station (e.g., 102). At which point, the completed movie list can be electronically submitted to distribution station 102 by the storage apparatus 112. In this manner, the consumer is able to spend less time at the distribution station 102 since the consumer's movie list was completed before arriving at the distribution station 102. Functionality associated with distribution station 102 can then determine whether the storage apparatus 112 has been previously certified (or authorized) to receive movie content 114 from distribution station 102. This operation along other operations associated with it are described below in more detail. If the storage apparatus 112 is pre-certified (or certified at distribution station 102), the desired movie content 114 of the submitted movie list can be downloaded to storage apparatus 112 to be stored.

Alternatively, once the movie list has been completed, the consumer can then submit it to central system 104 (or a web site) by, but not limited to, selecting a submit "button" provided by the user interface (e.g., web page, and the like). Upon receipt of the submitted movie list, the central system 104 can do a wide variety of operations associated with it. For example, the central system 104 can store the submitted movie list for subsequent download by the consumer's selected distribution station (e.g., 102). Or the central system 104 can transmit the submitted movie list to the consumer's selected distribution station (e.g., 102). In this fashion, the consumer is able to spend less time at the distribution station 102 since the consumer's movie list was completed before arriving at the distribution station 102. Note that the consumer can access his or her movie list at the selected distribution station 102 by utilizing the pre-established user ID and password as part of a login process.

Within FIG. 1, alternatively, once the movie list has been completed, it can be transmitted and routed to the consumer's specified distribution station (e.g., 102). For example, the user interface (e.g., web page) of central system 104 can provide the user a submit "button" which when selected via computing device 108, causes the newly generated movie list to be transmitted to the selected distribution station 102 via network 110. It is appreciated that the movie list can be sent to the selected distribution station 102 via electronic mail (e-mail) technology, but is not limited to such. Therefore, the consumer is able to spend less time at the distribution station 102 since the consumer's movie list was completed before arriving at the distribution station 102. It is appreciated that the consumer can access his or her movie list at the selected distribution station 102 by utilizing the pre-established user ID and password as part of a login process.

Once the consumer's movie list is received by the selected distribution station (e.g., 102), a determination can be made as to whether the selected movies 114 of the submitted movie list are resident to the distribution station. If so, the consumer can be notified that the movies 114 of the submitted movie list are currently available at the selected distribution station (e.g., 102). This notification can be implemented in diverse ways. For example, functionality associated with the selected distribution station 102 can send a notification message via e-mail to the consumer via network 110 and computing device 108. Alternatively, functionality associated with the selected distribution station 102 can transmit a voice notification message to the customer via telephone and/or mobile phone technologies (not shown).

However, if one or more of the movies 114 on the submitted movie list are not resident to the selected distribution station (e.g., 102), a request can be output by the distribution station 102 to central system 104 (via network 110) for delivery of any movie content 114 not resident to the distribution station 102. In response to receiving the movie request, the central system 104 can download and/or deliver the requested movie content 114 to the distribution station 102 which can subsequently store it. Note that if one or more movies 114 of the received request are not resident to central system 104, the central system 104 can output a request to content source 105 for deliver of the missing movie(s) 114. As such, the content source 105 can transmit and/or deliver the missing movie(s) 114s to central system 104 which can subsequently transmit and/or deliver the requested movies 114 to the distribution station 102.

Within FIG. 1, note that a movie list can be generated by machine or a user at a web site (as described herein), at a distribution station (e.g., 102), and a storage apparatus (e.g., 112). For example, when a user (or consumer) visits a distribution station (e.g., 102), he or she can generate a list of movies 114 that are to be purchased and/or rented. Note that this list can be stored by distribution station 102 for present and/or future use. Additionally, distribution station 102 can submit the movie list to central system 104 for different reasons. For instance, the movie list may be submitted to central system 104 for monitoring purposes. Alternatively, the movie list may be submitted to central system 104 thereby enabling it to be transmitted to any other distribution station (e.g., similar to distribution station 102) upon request by the consumer who created it.

A storage apparatus (e.g., 112) can be utilized to generate a movie list. For example, storage apparatus 112 can include a user interface (e.g., GUI) that enables a consumer (or user) to select one or more movies 114 that he or she desires to rent and/or purchase. Note that the storage apparatus 112 may include functionality associated with a computing device (e.g., 108). Therefore, storage apparatus 112 may be coupled with central system 104 (or a web site) via network 110 such that it can receive a current (or updated) listing of available movies 114 from system 100 that can be subsequently utilized by the consumer while the storage apparatus 112 is online and/or offline.

Within FIG. 1, to enable pre-ordering of movie content 114, an upcoming movie content listing can be downloaded by central system 104 to one or more web sites (not shown), one or more computing devices (e.g., 108), one or more storage apparatus (e.g., 112), and/or one or more distribution stations (e.g., 102). Based on the pre-ordering response to the upcoming movie listing, central system 104 (or its user) can gauge the demand for particular movie content 114 and accordingly adjust delivery and/or download of that movie content 114 to one or more distribution stations (e.g., 102).

The central system 104 can keep track of the movie content 114 that each consumer (or customer) purchases and/or rents from system 100. As such, this information can be utilized by central system 104 to generate (e.g., automatically) a movie recommendation list that can be downloaded to one or more websites and/or one or more distribution stations (e.g., 102). Therefore, the consumer (or user) can be shown (e.g., automatically) the movie recommendation list when he or she visits a distribution station (e.g., 102) and/or utilizes computing device 108 to visit a website associated with system 100. In this manner, each consumer can be provided (e.g., automatically) a movie recommendation list that may be useful to him or her in subsequent movie purchases and/or rentals. It is appreciated that this functionality can be enabled when the consumer establishes a consumer account with central system 104 that can involve the consumer identification and payment information along with the user ID and password, described herein.

Within FIG. 1, subsequent to the storage apparatus 112 being coupled with distribution station 102, functionality associated with distribution station 102 can determine whether the storage apparatus 112 has been certified (or authorized) to receive movie content 114 from system 100. This operation can take place while the customer is deciding and/or selecting any movies 114 the customer wants to rent and/or purchase. Alternatively, this operation can take place while the customer is submitting payment and/or consumer identification information to distribution station 102. Or the certification determination can take place once the electronic storage apparatus 112 is coupled with the distribution station 102. Note that the authorization determination can be implemented in a wide variety of ways. For example, the functionality associated with distribution station 102 can determine whether the storage apparatus 112 includes security functionality (e.g., software and/or hardware) 116 in accordance with embodiments of the invention. Moreover, the functionality associated with distribution station 102 can determine whether the storage apparatus 112 includes an updated or latest version of security functionality (e.g., software and/or hardware) 116 in accordance with embodiments of the invention.

Within FIG. 1, if the functionality determines that the electronic storage apparatus 112 is certified (or authorized) to receive movie content 114, it allows the distribution station 102 to download the selected movies 114 to storage apparatus 112 at an appropriate time. However, if the electronic storage apparatus 112 has not been certified, the functionality restricts distribution station 102 from downloading any movie content 114 to storage apparatus 112. Furthermore, distribution station 102 can inform the user (e.g., via a display device, an audio speaker, and the like) that the desired download will not occur. Alternatively, if the electronic storage apparatus 112 has not been certified, it can be determined whether storage apparatus 112 can be certified (or authorized) to receive movie content 114. For example, functionality associated with the distribution station 102 can determine if the storage apparatus 112 includes enough available storage (or memory) for installing security functionality 116 (or its upgrade or latest version) in accordance with embodiments of the invention. If so, the distribution station 102 can clandestinely download and install the security functionality 116 (e.g., software) or its upgrade or latest version onto the storage apparatus 112. After which, the selected movie content 114 can be downloaded to the storage apparatus 112 at an appropriate time. However, if the electronic storage apparatus 112 cannot be certified (or authorized) to receive movie content 114, the user can be notified of such. Note that if electronic storage apparatus 112 does receive the selected movie content 114, the consumer (or customer) can uncouple storage apparatus 112 from distribution station 102.

The storage apparatus (or device) 112 can be implemented in a wide variety of ways. For example, storage apparatus 112 can be implemented as, but not limited to, removable electronic storage, portable electronic storage, DVD-RW, DVD+RW, DVD-RAM, hard drive technology, portable computing device having storage, and the like. As such, depending on how the storage apparatus 112 is implemented, it can be coupled with the distribution station 102 is diverse ways. For example, if the storage apparatus 112 is implemented as a hard drive, it can be coupled with distribution station 102 utilizing wired and/or wireless communication technology. Alternatively, if the storage apparatus 112 is implemented as a DVD-RW, it can be coupled with distribution station 102 by inserting it into a DVD-RW drive. It is understood that distribution station 102 can be implemented to include any type of technology for coupling the storage apparatus 112 with it. Moreover, the distribution station 102 can be implemented to include multiple types of technology for coupling multiple types of electronic storage apparatus (e.g., 112) with it.

Within FIG. 1, the communication network 110 can be implemented in a wide variety of ways. For example, network 110 may be implemented as, but is not limited to, one or more local area networks (LANs), one or more metropolitan area networks (MANs), one or more wide area networks (WANs), the Internet, or any combination thereof. Furthermore, network 110 can include wired and/or wireless communication technologies.

Note that content source 105 can download (or transmit) movie content 114s to central system 104 in an encrypted format. Furthermore, central system 104 can download (or transmit) movie content 114 to distribution station 102 in an encrypted format. Moreover, distribution station 102 can download (or transmit) movie content 114 to storage apparatus 112 in an encrypted format. Each of these downloads (or transmissions) of encrypted movie content (e.g., 114s or 114) can be implemented by utilizing, but is not limited to, method 900 or 1000 of FIGS. 9 and 10, respectively.

Figure 2:
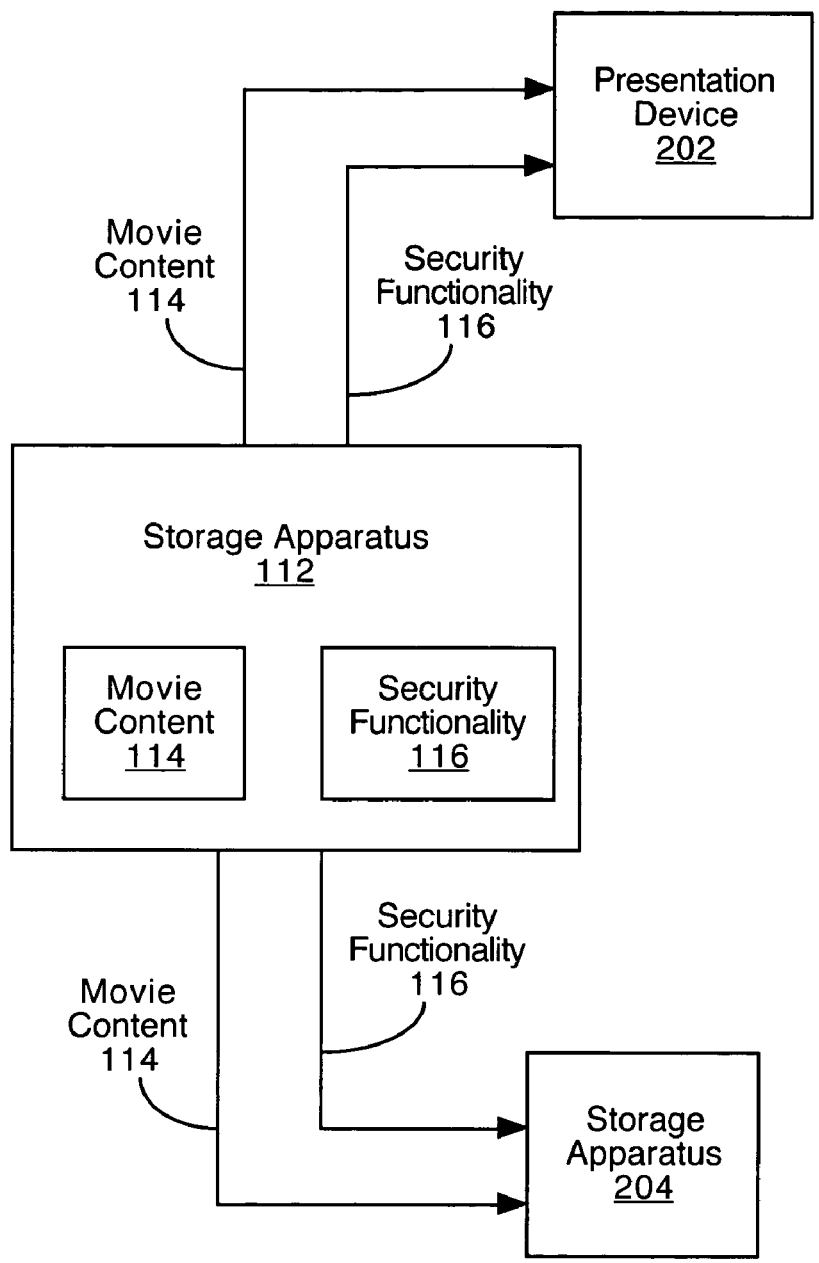
FIG. 2 is a block diagram of an exemplary system illustrating how movie content can be distributed in accordance with embodiments of the invention.

FIG. 2 is a block diagram of an exemplary system 200 illustrating how movie content (e.g., 114) can be distributed in accordance with embodiments of the invention. Specifically, once the electronic storage apparatus (or device) 112 includes the selected movie content 114, the consumer can watch the movie content 114 and/or transfer the movie content 114 (or a copy of it) to another storage apparatus or device (e.g., 204).

For example, if the storage apparatus 112 includes the capability to present the movie content 114 to a viewer, it can be activated to do such. Alternatively, if the storage apparatus 112 does not include presentation capability, it can be coupled with a movie presentation device 202 that includes movie content presentation capability. Subsequent to being coupled to presentation device 202, the security functionality 116 (e.g., software and/or hardware) resident to the electronic storage apparatus 112 can determine whether the movie presentation device 202 has been certified (or authorized) to receive movie content 114. Note that the certification determination can be implemented in a wide variety of ways. For instance, the security functionality 116 of the storage apparatus 112 can determine whether the presentation device 202 includes security functionality (e.g., 116) in accordance with embodiments of the invention. Furthermore, the functionality 116 associated with storage apparatus 112 can determine whether the presentation device 202 includes the updated or latest version of security functionality (e.g., software and/or hardware) 116 in accordance with embodiments of the invention.

Within FIG. 2, if the security functionality 116 of the storage apparatus 112 determines that the presentation device 202 is certified (or authorized) to receive movie content 114, the security functionality 116 enables and/or allows movie content 114 to be transmitted or downloaded to the presentation device 202 for presenting and/or storage. However, if the presentation device 202 is not authorized (or certified), the security functionality 116 of the storage apparatus 112 does not transmit or allow transmission of any movie content 114 to the presentation device 202. Note that storage apparatus 112 can inform its user (e.g., via a display device, an audio speaker, and the like) that the desired download or transfer will not occur. Alternatively, if presentation device 202 has not been certified, it can be determined whether presentation device 202 can be certified (or authorized) to receive movie content 114. For example, security functionality 116 associated with storage apparatus 112 can determine if the presentation device 202 includes enough available storage (or memory) for installing a copy of security functionality 116 (e.g., software) or its upgrade or latest version in accordance with embodiments of the invention. If so, the storage apparatus 112 can clandestinely download and install a copy of security functionality 116 (e.g., software) or its upgrade or latest version onto presentation device 202. After which, the selected movie content 114 (or a copy of it) can be downloaded to presentation device 202 by storage apparatus 112. It is appreciated that if presentation device 202 cannot be certified (or authorized) to receive movie content 114, the user can be notified of such.

It is understood that another storage apparatus or device (e.g., 204) can be coupled with storage apparatus 112 to receive a download of movie content 114 (or a copy of it). Note that the processes associated with downloading movie content 114 (or a copy of it) from storage apparatus 112 to storage apparatus 204 can be implemented in any manner similar to the processes associated with downloading movie content 114 (or a copy of it) from storage apparatus 112 to presentation device 202, described herein.

Within FIG. 2, note that storage apparatus 112 can download (or transmit) movie content 114 to presentation device 202 in an encrypted format. Furthermore, storage apparatus 112 can download (or transmit) movie content 114 to storage apparatus 204 in an encrypted format. Each of these downloads (or transmissions) of encrypted movie content (e.g., 114) can be implemented by utilizing, but is not limited to, method 900 or 1000 of FIGS. 9 and 10, respectively.

Figure 3:
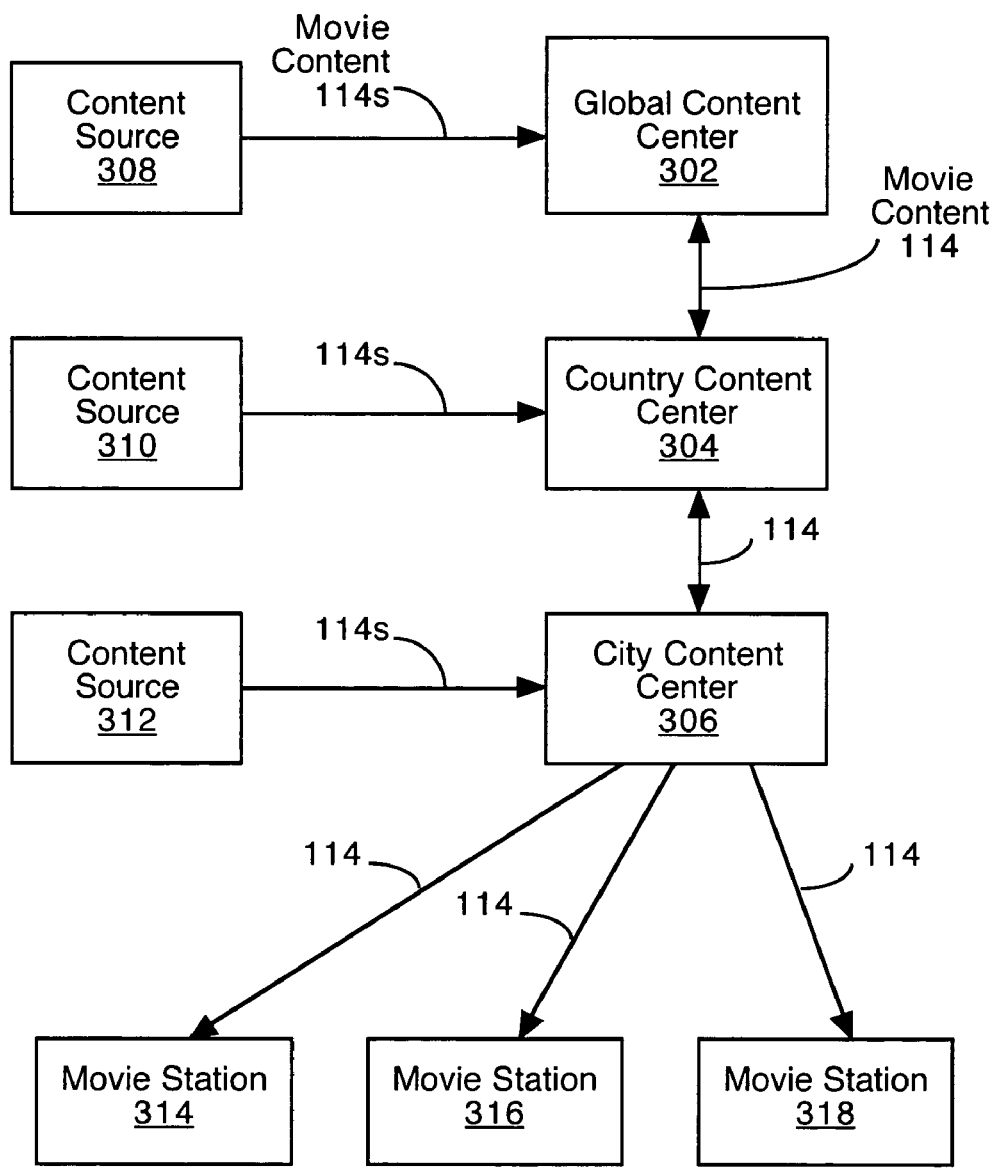
FIG. 3 is a block diagram of an exemplary multilevel distribution system in accordance with embodiments of the invention.

FIG. 3 is a block diagram of an exemplary multilevel distribution system 300 in accordance with embodiments of the invention. Specifically, the multilevel distribution system 300 includes distribution stations 314, 316, and 318 that are each capable of distributing digital movie content 114 to customers that can be purchased and/or rented, but is not limited to such. Each of distribution station 314, 316, and 318 can be implemented in any manner similar to distribution station 102, as described herein. Multilevel distribution system 300 includes content sources 308, 310, and 312 which can each provide movie content 114s (e.g., digital and/or analog) to a global content center 302, a country content center 304, and a city content center 306, respectively. Note that the content sources 308, 310, and 312 can transmit the movie content 114s to content centers 302, 304, and 306, respectively, using one or more communication networks (e.g., 110). Alternatively, content sources 308, 310, and 312 can each store the movie content 114s onto one or more electronic storage apparatuses (e.g., removable electronic storage, portable electronic storage, DVD-RW, DVD+RW, DVD-RAM, hard drive technology, and the like) that can be physically delivered to the appropriate content center (e.g., 302, 304, or 306).

Once the movie content 114s is received by the global content center 302, country content center 304, and/or the city content center 306, the movie content 114s can be converted into a digital format, if not already in that format. Note that each content center 302, 304, and 306 can distribute movie content 114 which may or may not be in a different format than the originally received movie content 114s. Movie content 114 can be exchanged and/or distributed between global content center 302 and country content center 304. Furthermore, movie content 114 can be exchanged and/or distributed between country content center 304 and city content center 306. Also, movie content 114 can be exchanged and/or distributed between city content center 306 and distribution stations 314, 316, and/or 318. The city content center 306 can include supervisory and/or managerial functionality over distribution stations 314, 316, and 318. The country content center 304 can include supervisory and/or managerial functionality over city content center 306, along with whatever is within the purview of city content center 306. The global content center 302 can include supervisory and/or managerial functionality over country content center 304, along with whatever is within the purview of country content center 304. The distribution of movie content 114 within the multilevel distribution system 300 can be done utilizing one or more communication networks and/or physically delivering one or more electronic storage apparatuses (e.g., 112) to the desired location.

Within FIG. 3, content centers 302, 304, and 306 can each be implemented as a single physical computing device (e.g., 1100 of FIG. 11) or multiple computing devices (e.g., 1100). It is noted that central system 104 (FIG. 1) can be implemented to include, but is not limited to, content centers 302, 304, and 306. Furthermore, it is appreciated that content source 105 (FIG. 1) can include multiple content sources such as, but not limited to, content sources 308, 310, and 312.

Within multilevel distribution system 300, the content source 308 is coupled with the global content center 302 which is coupled with the country content center 304. Additionally, the content source 310 is coupled with the country content center 304 which is coupled with the city content center 306. Furthermore, the content source 312 is coupled with the city content center 306 which is coupled with distribution stations 314, 316, and 318. Note that the coupling within multilevel distribution system 300 can include wired and/or wireless communication technologies.

Figure 4:
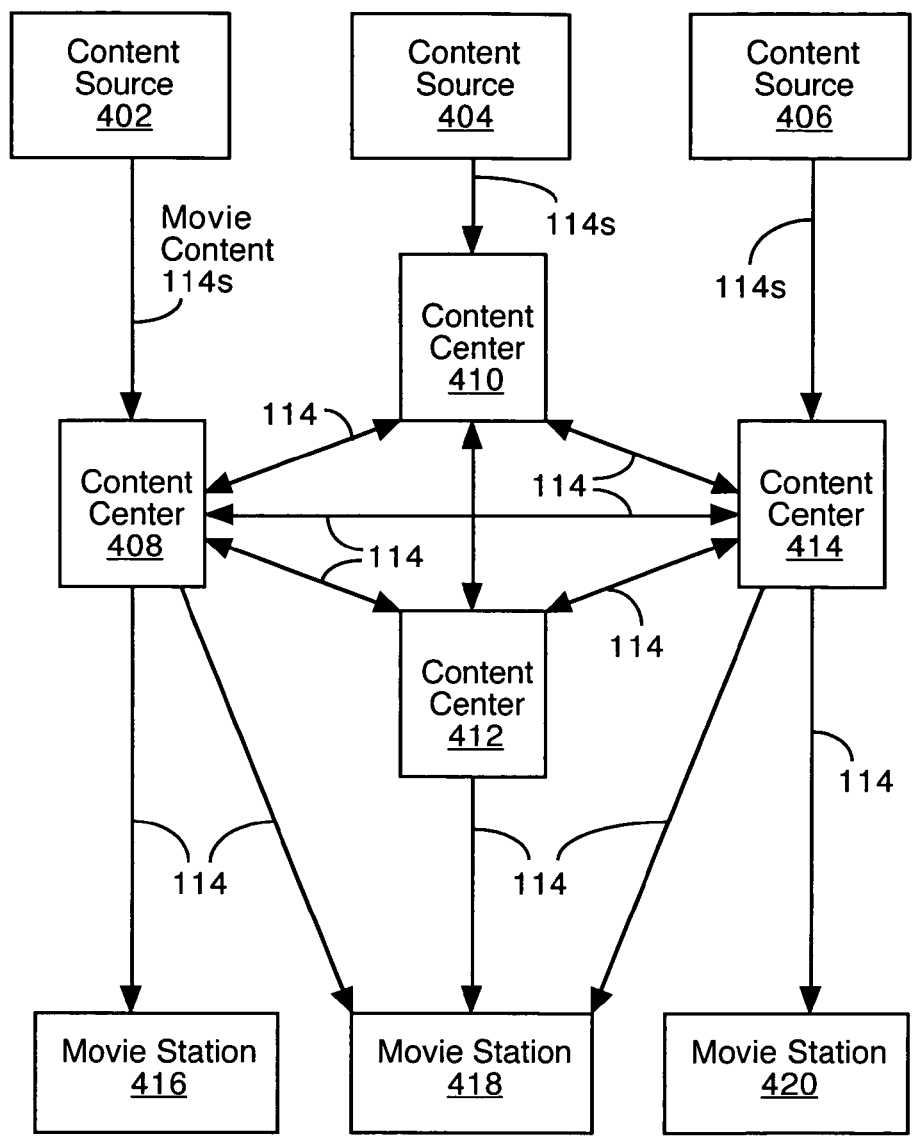
FIG. 4 is a block diagram of an exemplary peer-to-peer distribution system in accordance with embodiments of the invention.

FIG. 4 is a block diagram of an exemplary peer-to-peer distribution system 400 in accordance with embodiments of the invention. Specifically, the peer-to-peer distribution system 400 includes distribution stations 416, 418, and 420 that are capable of distributing digital movies to consumers that can be purchased and/or rented, but are not limited to such. Each of distribution station 416, 418, and 420 can be implemented in any manner similar to distribution station 102, as described herein. Peer-to-peer distribution system 400 includes content sources 402, 404, and 406 which can each provide movie content 114s (e.g., digital and/or analog) to content centers 408, 410, and 414, respectively. Note that the content sources 402, 404, and 406 can transmit the movie content 114s to content centers 408, 410, and 414, respectively, using one or more communication networks (e.g., 110). Alternatively, content sources 402, 404, and 406 can each store the movie content 114s onto one or more electronic storage apparatuses (e.g., removable electronic storage, portable electronic storage, DVD-RW, DVD+RW, DVD-RAM, hard drive, and the like) that can be physically delivered to the appropriate content center (e.g., 408, 410, or 414).

Once the movie content 114s is received by content centers 408, 410, and/or 414, the movie content 114s can be converted into a digital format, if not already in that format. Note that each content center 408, 410, 414, and 412 can distribute movie content 114 which may or may not be in a different format than the originally received movie content 114s. It is understood that movie content 114 can be exchanged and/or distributed between content centers 408, 410, 412, and 414 in a peer-to-peer manner. Furthermore, movie content 114 can be exchanged and/or distributed between content center 408 and distribution stations 416 and 418. Content center 408 can include supervisory and/or managerial functionality over distribution stations 416 and 418. Movie content 114 can be exchanged and/or distributed between content center 412 and distribution station 418. The content center 412 can include supervisory and/or managerial functionality over distribution station 418. Additionally, movie content 114 can be exchanged and/or distributed between content center 414 and distribution stations 418 and 420. Content center 414 can include supervisory and/or managerial functionality over distribution stations 418 and 420. The distribution of movie content 114 within the peer-to-peer distribution system 400 can be done utilizing one or more communication networks (e.g., 110) and/or physically delivering one or more electronic storage apparatuses (e.g., 112) to the desired location.

Within FIG. 4, content centers 408, 410, 412, and 414 can each be implemented as a single physical computing device (e.g., 1100 of FIG. 11) or multiple computing devices (e.g., 1100). It is noted that central system 104 (FIG. 1) can be implemented to include, but is not limited to, content centers 408, 410, 412, and 414. Furthermore, it is appreciated that content source 105 (FIG. 1) can include multiple content sources such as, but not limited to, content sources 402, 404, and 406.

Within peer-to-peer distribution system 400, the content source 402 is coupled with content center 408 which is coupled with content centers 410, 412, and 414. Content center 408 is also coupled with distribution stations 416 and 418. Additionally, the content source 404 is coupled with content center 410 which is coupled with content centers 408, 412, and 414. Moreover, the content source 406 is coupled with content center 414 which is coupled with content centers 408, 410, and 412. Content center 414 is also coupled with distribution stations 418 and 420. The content center 412 is coupled with distribution station 418. Note that the coupling within peer-to-peer distribution system 400 can include wired and/or wireless communication technologies.

Note that the multilevel distribution system 300 of FIG. 3 and the peer-to-peer distribution system 400 of FIG. 4 can be combined in a wide variety of ways to form embodiments in accordance with the invention.

Within FIGS. 3 and 4, it is noted that any transfer or download or transmission of movie content (e.g., 114s and/or 114) can be implemented such that the movie content is in an encrypted format. For example, any transfer or download or transmission of encrypted movie content (e.g., 114s and/or 114) can be implemented by utilizing, but is not limited to, method 900 or 1000 of FIGS. 9 and 10, respectively.

Figure 5:
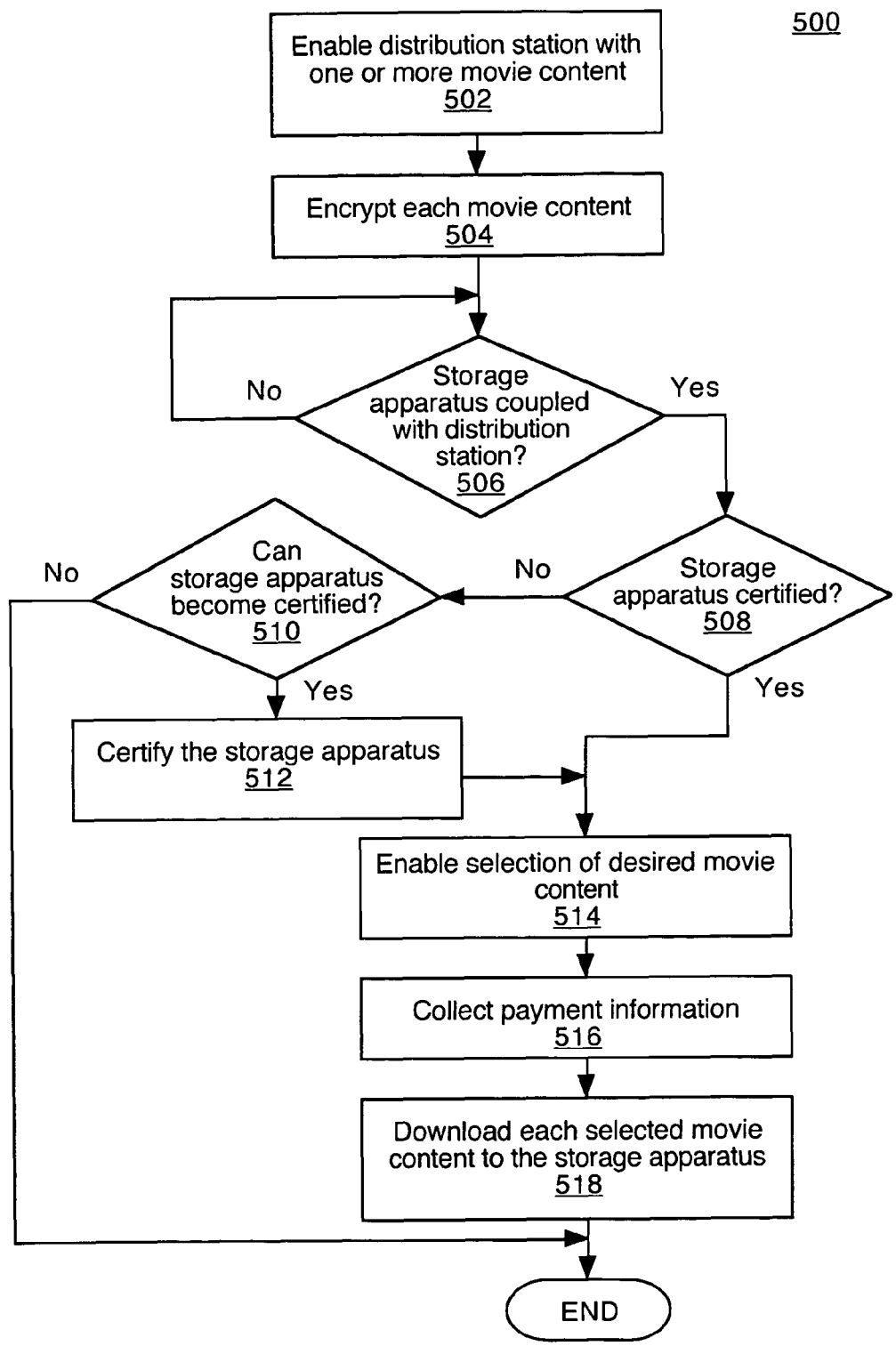
FIG. 5 is a flowchart of a method in accordance with embodiments of the present invention for distributing movies to a customer via a distribution station.

FIG. 5 is a flowchart of a method 500 in accordance with embodiments of the invention for distributing movies to a customer via a distribution station. Method 500 includes processes of embodiments of the invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 500, such operations are exemplary. That is, method 500 may not include all of the operations illustrated by FIG. 5. Alternatively, method 500 may include various other operations and/or variations of the operations shown by FIG. 5. It is noted that the operations of method 500 can each be performed by software, by firmware, by hardware or by any combination thereof.

Specifically, a distribution station can be enabled with movies that may be purchased and/or rented by customers. Each of the movies stored by the distribution station can be encrypted. A determination is made as to whether a storage apparatus has been coupled with the distribution station. If not, the determination is continually repeated. However, once a storage apparatus is coupled with the distribution station, a determination is made as to whether it has been certified to receive movies. If so, its user is enabled to select which movies he or she would like to purchase and/or rent. However, if the storage apparatus is not certified, a determination is made as to whether the storage apparatus can become certified. If not, method 500 is exited. If so, the storage apparatus can then be certified by the distribution station to receive movies from it. The user is then enables to select movies that he or she would like to purchase and/or rent. Once the movie selections have been completed, payment information can be collected associated with the movie transaction. A copy of each selected movie can be downloaded to the storage apparatus where it is stored. In this manner, method 500 distributes movie content to a customer via the distribution station in accordance with embodiments of the invention.

At operation 502, a distribution station (e.g., 102) is enabled with one or more movies (e.g., 114) that may be purchased and/or rented by customers that utilize the distribution station. Operation 502 may be implemented in a wide variety of ways. For example, movie content can be downloaded to the distribution station via one or more communication networks (e.g., 110). After which, the movie content can then be stored by the distribution station. Alternatively, one or more storage devices or apparatus (e.g., 112) that include movie content can be installed or coupled with the distribution station at operation 502. It is noted that the movie content can be in any format including, but not limited to, high-definition (HD) movie content. The movie content can be digitized before or after the distribution station receives them. The distribution station can be implemented in diverse ways. For example, the distribution station can be implemented as a free standing computer system having storage capabilities sufficient for storing many movies (e.g., 100, 250, 500, or more). Alternatively, the distributions station can be implemented as a free standing kiosk similar in dimensions to a free standing ATM (automated teller machine) that may be found in a grocery store or other type of business. Furthermore, the free standing kiosk distribution station can include one or more computing devices (e.g., 1100 of FIG. 11) having storage capabilities sufficient for storing movie content. Additionally, the distribution station can be implemented such that it is fully automated and includes a display device for providing an "easy-to-use" consumer interface in the form of, but not limited to, a graphical user interface (GUI). It is understood that operation 502 can be implemented by utilizing, but is not limited to, method 900 or 1000 of FIGS. 9 and 10, respectively.

At operation 504 of FIG. 5, each movie content received by the distribution station can be encrypted. The encrypting of each movie content at operation 504 can be implemented in diverse ways. For example, any digital encryption technique can be used at operation 504. Furthermore, each movie can be encrypted at operation 504 utilizing a different encryption technique. Note that the order in which operations 502 and 504 are performed is not limited to that shown in FIG. 5. For example, the encryption at operation 504 of each movie to be stored by the distribution station can be performed prior to operation 502. Alternatively, operations 502 and 504 can be performed in a concurrent or simultaneous manner. For example, while the encryption of each movie is taking place at operation 504, the encrypted movies can be downloaded to the distribution station at operation 502.

At operation 506, a determination is made as to whether a storage apparatus or device (e.g., 112) has been coupled with the distribution station. If not, method 500 proceeds to the beginning of operation 506 in order to repeat it. In this manner, operation 506 can be continually repeated until a storage apparatus is coupled with the distribution station. Once it is determined at operation 506 that a storage apparatus has been coupled with the distribution station, method 500 proceeds to operation 508. Note that the storage apparatus can be implemented in a wide variety of ways. For example, the storage apparatus can be implemented as, but not limited to, removable electronic storage, portable electronic storage, DVD-RW, DVD+RW, DVD-RAM, computing device having storage, or hard drive technology.

At operation 508 of FIG. 5, a determination is made as to whether the storage apparatus coupled with the distribution station has been previously certified (or authorized) to receive movies. If so, method 500 proceeds to operation 514. However, if it is determined at operation 508 that the storage apparatus has not been previously certified, method 500 proceeds to operation 510. Note that operation 508 can be implemented in a wide variety of ways. For example, security functionality (e.g., 116) associated with the distribution station can perform operation 508. In one embodiment, an electronic identifier (or flag) can be utilized to indicate that the storage apparatus is certified or authorized to receive movies. As such, the security functionality associated with the distribution station can search the storage apparatus for the electronic certified identifier (or flag) at operation 508 to determine whether it has been certified. Alternatively, the security functionality (e.g., 116) associated with the distribution station can search the storage apparatus for something similar to the security functionality (e.g., 116). In another embodiment, the security functionality (e.g., 116) associated with the distribution station can search the storage apparatus for the updated or latest version of security functionality (e.g., 116) in accordance with embodiments of the invention.

At operation 510, a determination is made as to whether the storage apparatus can become certified (or authorized) to receive movies. If not, method 500 is exited. However, if determined at operation 510 that the storage apparatus can become certified, method 500 proceeds to operation 512. Operation 510 can be implemented in a wide variety of ways. For example, security functionality (e.g., 116) associated with the distribution station can perform operation 510 by determining if the storage apparatus includes enough available storage (or memory) for installing security functionality (e.g., 116) or its upgrade or its latest version such as, but not limited to, software in accordance with embodiments of the invention. If so, the security functionality can determine at operation 510 that the storage apparatus can become certified (or authorized) to receive movies.

At operation 512 of FIG. 5, the storage apparatus is certified to receive movies from the distribution station. Note that the storage apparatus can be certified at operation 512 in a wide variety of ways. For example, the distribution station can download and install security functionality (e.g., 116) or its upgrade or its latest version such as, but not limited to, software onto the storage apparatus. The security functionality (or its upgrade or latest version) can include functionality intended to restrict future unauthorized copying of any movies downloaded onto the storage apparatus. Furthermore, the security functionality (or its upgrade or latest version) can include functionality that monitors any movie content downloaded onto the storage apparatus such that rental conditions are adhered to. It is noted that when the time period of the rental agreement associated with the downloaded movie content expires, the security functionality can proceed to delete the movie content from the storage apparatus or render it useless.

At operation 514, a customer (or user) of the distribution station can be empowered to select one or more movie content that he or she desires to purchase and/or rent from the distribution station. It is appreciated that operation 514 can be implemented in diverse ways. For example, if the distribution station is implemented with a display device, a user interface (e.g., GUI) can be presented to the customer (or user) via the display device at operation 514 thereby enabling him or her to select one or more movies to purchase and/or rent from the distribution station.

At operation 516, payment information can be collected from the user of the distribution station that is associated with the desired or selected movie content. It is understood that the payment information can be implemented a wide variety of ways. For example, the payment information can be implemented as a point system that is stored on a movie point card. As such, a user may insert his or her movie point card into a receiver slot of the distribution station and a certain number of points can be deducted from it for the movies that are being purchased and/or rented. Alternatively, a user may insert a credit card into a receiver slot of the distribution station wherein the price associated with the purchase and/or rental of the movies is assert against that account. As part of the credit card transaction, the distribution station can submit the credit card information to its corresponding financial institution (e.g., 106) for authorization indicating the credit card can cover the transaction. Within another embodiment, the user can insert a user identification along with a password which can result in the deduction of the transactional cost from a prepaid balance that may be maintain by the distribution station and/or some other computing device or tracking system (e.g. 104) communicatively coupled with the distribution station. The payment information can also include the consumer's name, mailing address, phone number, e-mail address, and the like.

At operation 518 of FIG. 5, each selected movie content (or a copy of it) can be downloaded or transmitted to the storage apparatus which can subsequently store them. It is understood that each downloaded movie content has been previously encrypted, as described herein with reference to operation 504. Upon completion of operation 518, the process 500 is exited. Note that operation 518 can be implemented by utilizing, but is not limited to, method 900 or 1000 of FIGS. 9 and 10, respectively.

Figure 6:
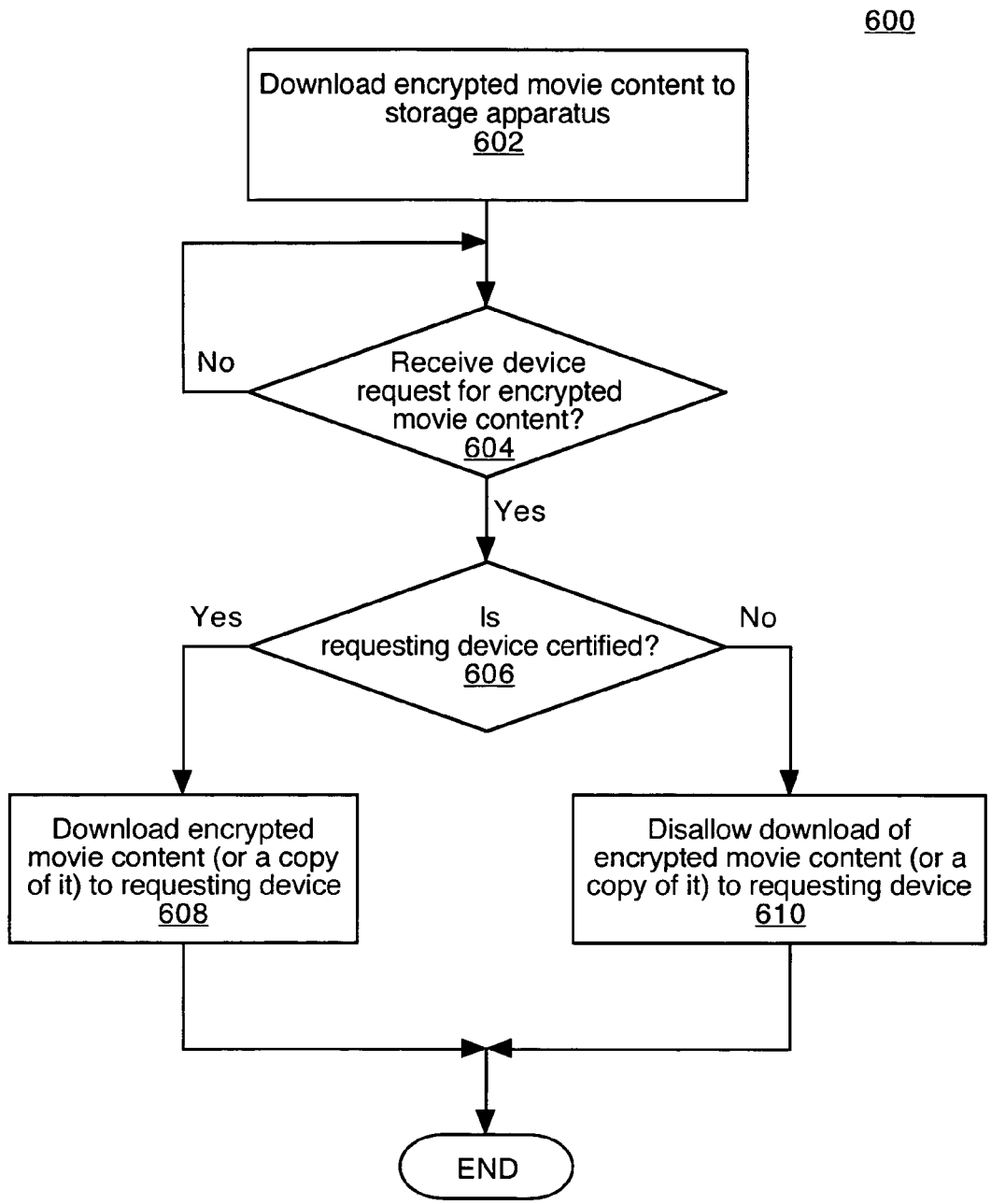
FIG. 6 is a flowchart of a method in accordance with embodiments of the present invention for maintaining security integrity of downloaded movie content.

FIG. 6 is a flowchart of a method 600 in accordance with embodiments of the invention for maintaining security integrity of downloaded movie content. Method 600 includes processes of embodiments of the invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 600, such operations are exemplary. That is, method 600 may not include all of the operations illustrated by FIG. 6. Alternatively, method 600 may include various other operations and/or variations of the operations shown by FIG. 6. It is noted that the operations of method 600 can each be performed by software, by firmware, by hardware or by any combination thereof.

Specifically, encrypted movie content can be downloaded to a certified storage apparatus. A determination is made as to whether another device is requesting a download or transfer of the encrypted movie content (or a copy of it) from the certified storage apparatus. If not, that determination is continually repeated until answered in the affirmative. If it is determined that another device is requesting a download of the encrypted movie content, a determination is made as to whether the requesting device is certified to receive the movie content (or its copy). If not, the encrypted movie is not allowed to be downloaded to the requesting device. However, if the requesting device is certified, the encrypted movie content (or its copy) can be downloaded (or transmitted) to the requesting device. In this manner, method 600 is able to maintain the security integrity of downloaded (or transmitted) movie content in accordance with embodiments of the invention.

At operation 602 of FIG. 6, encrypted movie content (e.g., 114) can be downloaded to a certified storage apparatus (e.g., 112) where it can be stored. Note that the storage apparatus can be certified in diverse ways. For example, the storage apparatus can be certified in any manner similar to that described herein, but is not limited to such. It is appreciated that the storage apparatus can be implemented in any manner similar to that described herein, but is not limited to such. It is understood that operation 602 can be implemented by utilizing methods 500, 900, and/or 1000 of FIGS. 5, 9, and 10, respectively.

At operation 604, a determination is made as to whether a device or apparatus (e.g., 202 or 204) has requested reception of the encrypted movie content (or a copy of it). If not, process 600 proceeds to the beginning of operation 604. However, if determined at operation 604 that a device or apparatus has requested reception of the encrypted movie content, process 600 proceeds to operation 606. It is understood that the requesting device can include a wide variety of devices. For example, the requesting device can be implemented as, but is not limited to, a portable storage device, a removable storage device, a computing device, a movie presentation device, storage apparatus, and the like.

At operation 606 of FIG. 6, a determination is made as to whether the requesting device is certified (or authorized) to receive the movie content (or its copy). If not, process 600 proceeds to operation 610. However, if determined at operation 606 that the requesting device is certified, process 600 proceeds to operation 608. It is appreciated that operation 606 can be performed by a security feature or functionality (e.g., 116) associated with the certified storage apparatus. The security feature (or functionality) can be implemented as, but is not limited to, software, firmware, hardware, or any combination thereof.

At operation 608, the encrypted movie content (e.g., 114) or its copy can be downloaded (or transmitted or transferred) to the requesting device. It is understood that once the requesting device has received the encrypted movie content, it may then store the encrypted movie content and/or present it to a viewer. Upon completion of operation 608, process 600 is exited.

At operation 610 of FIG. 6, the encrypted movie content is restricted from being downloaded (or transmitted or transferred) to the requesting device. Operation 610 can be implemented in a wide variety of ways. For example, the security feature or functionality (e.g., 116) associated with the certified storage apparatus mentioned herein can perform operation 610. Upon completion of operation 610, process 600 is exited. As such, method 600 is able to maintain the security integrity of downloaded movie content by restricting which requesting devices or apparatuses can receive them.

Figure 9:
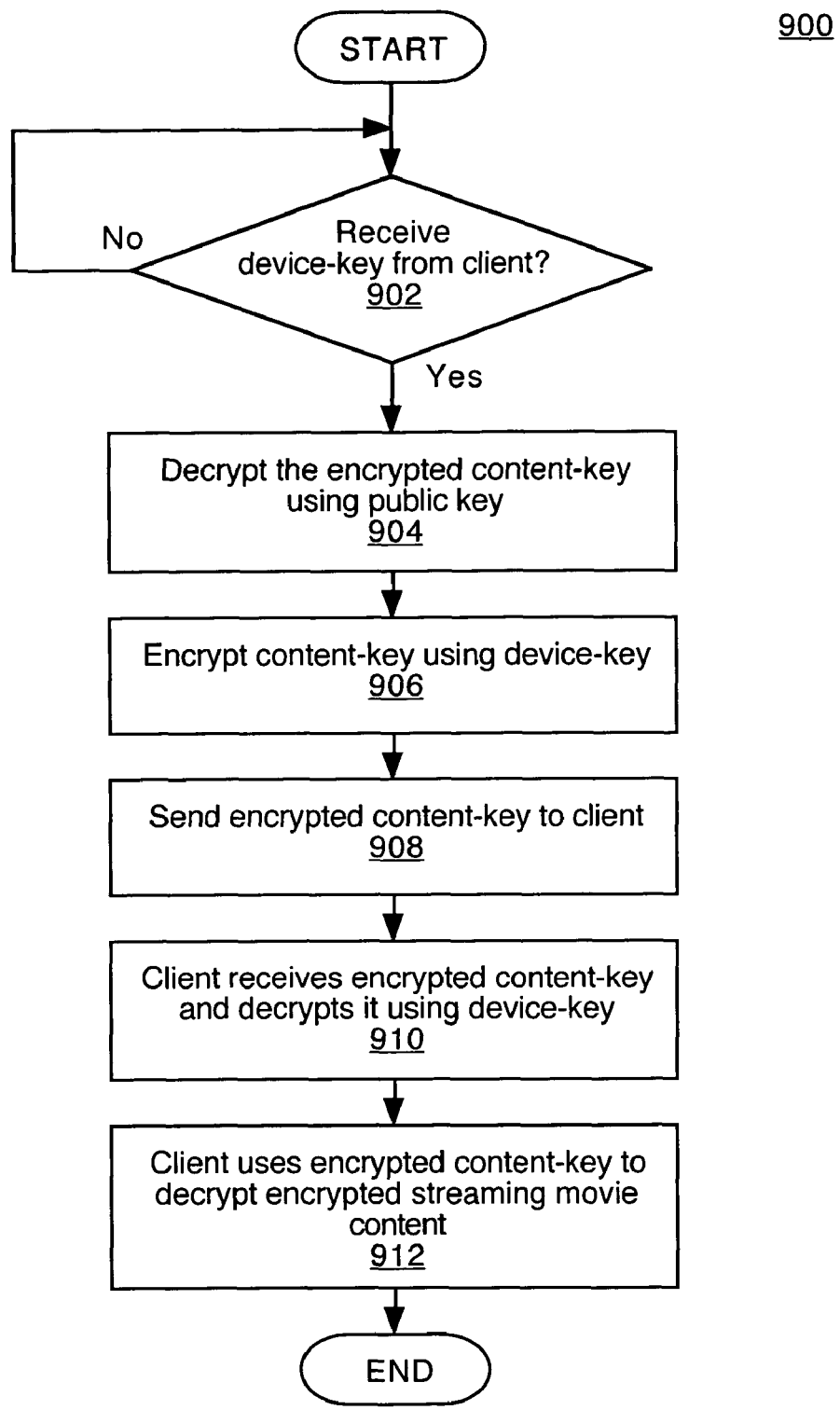
FIG. 9 is a flowchart of a method in accordance with embodiments of the invention for providing encryption for streaming movie content.
Figure 10:
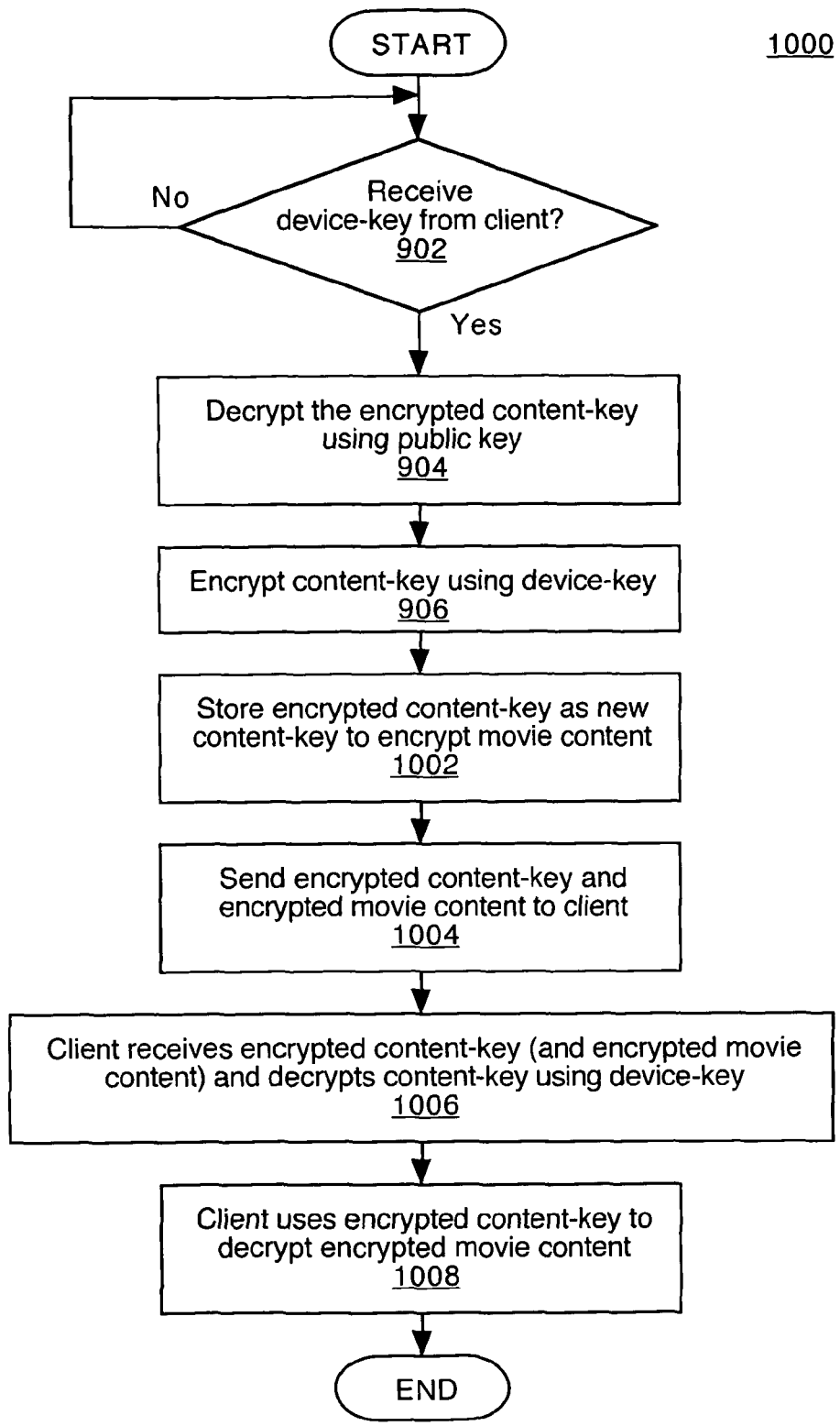
FIG. 10 is a flowchart of a method in accordance with embodiments of the invention for providing encryption for downloaded movie content.

Note that operations 608 and 610 can each be implemented by utilizing method 900 or 1000 of FIGS. 9 and 10, respectively.

Figure 7:
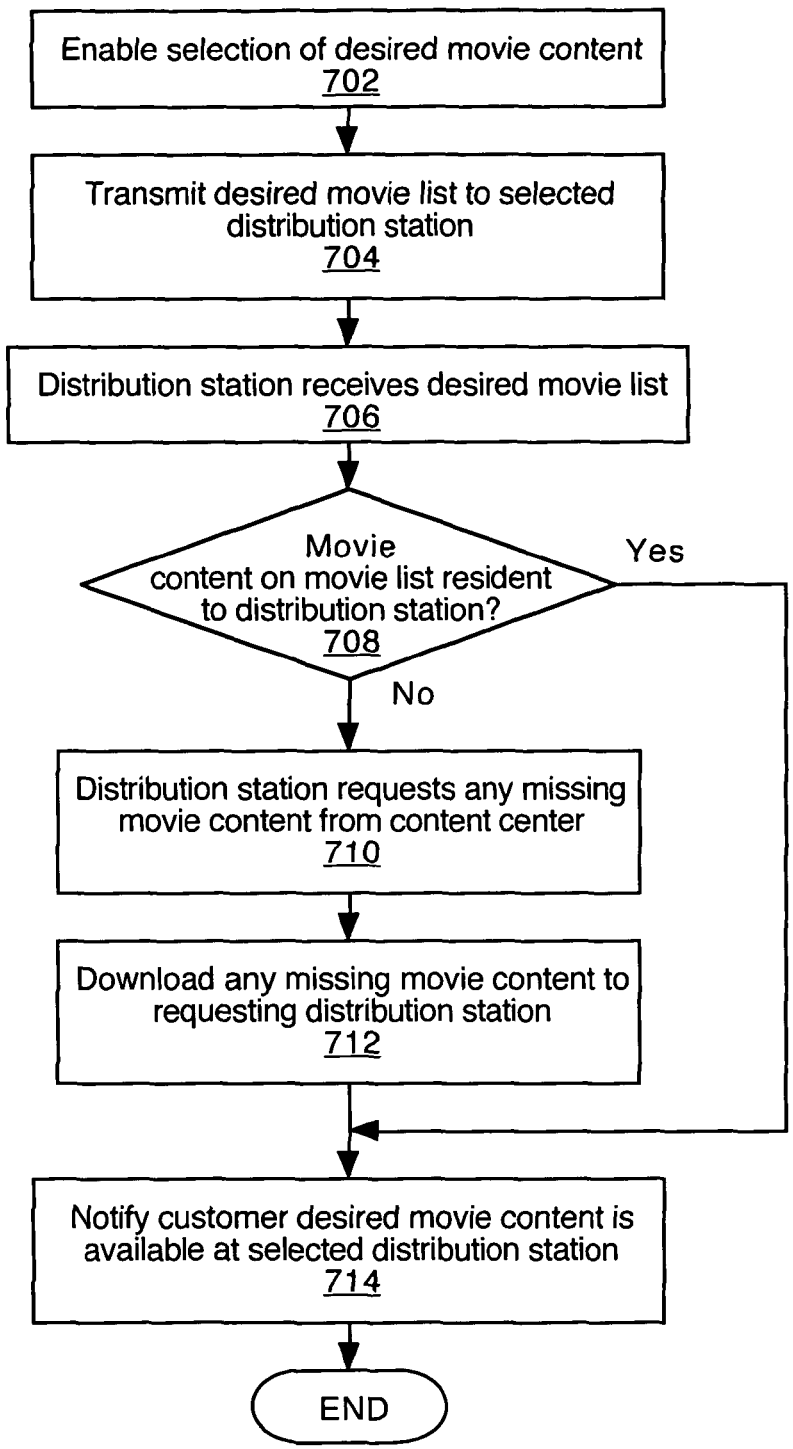
FIG. 7 is a flowchart of a method in accordance with embodiments of the present invention for enabling remote selection of movie content for subsequent retrieval from a distribution station.

FIG. 7 is a flowchart of a method 700 in accordance with embodiments of the invention for enabling remote selection of movie content for subsequent retrieval from a distribution station. Method 700 includes processes of embodiments of the invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 700, such operations are exemplary. That is, method 700 may not include all of the operations illustrated by FIG. 7. Alternatively, method 700 may include various other operations and/or variations of the operations shown by FIG. 7. It is noted that the operations of method 700 can each be performed by software, by firmware, by hardware or by any combination thereof.

Specifically, a customer is enabled to remotely select movie content that he or she desires to purchase and/or rent from a particular distribution station. Once selected, a list of desired movie content can be transmitted and routed to the selected distribution station. Once the movie list is received, a determination is made as to whether the movie content on the list is resident to the distribution station. If so, the customer can be notified that the desired movies are currently available at the selected distribution station. However, if one or more movie content of the list are not resident to the distribution station, a request is sent out from the distribution station to a content center for delivery of the missing movie content. In response to the distribution station request, the content center downloads or transmits the requested movie content to the distribution station which can then store it. After receipt of the requested movie content, the customer can be notified that the desired movie content are currently available at the selected distribution station. In this manner, when the customer subsequently arrives at the distribution station to rent and/or purchase the selected movie content, it will be available for him or her.

At operation 702 of FIG. 7, a customer is enabled to remotely select movie content (e.g., 114) that he or she desires to purchase and/or rent from a particular distribution station (e.g., 102). In this manner, the customer can create or generate a list of desired movie content. Note that operation 702 can be implemented in a wide variety of ways. For example, a web page could be provided on the Internet (or other type of communication network) thereby enable the customer to remotely select movie content that the consumer desires to rent and/or purchase. Additionally, the web page can also include a directory or listing of different available distribution stations (e.g., 102) thereby enabling the customer to select the distribution station he or she wants to use to retrieve the selected movie content.

At operation 704, once a list of movie content is completed, it can be transmitted and routed to the specific distribution station selected by the customer. It is understood that operation 704 can be implemented in diverse ways. For example, the wed page previously mentioned can also provide the customer a submit "button" which when selected, causes the newly generated movie list to be transmitted to the selected distribution station. Alternatively, the movie list can be sent to the distribution station via electronic mail (e-mail) technology. Note that the movie list can be transmitted to a central system (e.g., 104) to be handled in any manner similar to that described herein.

At operation 706 of FIG. 7, the distribution station receives the transmitted movie list. It is appreciated that operation 706 can be implemented in a wide variety of ways. For example, the distribution station can receive the transmitted movie list via the Internet (e.g., 110). Alternatively, the distribution station may periodically check with a central system (e.g., 104) to retrieve submitted movie lists. In another embodiment, the distribution station may periodically check an e-mail account to retrieve submitted movie lists.

At operation 708, a determination is made as to whether the movie content on the submitted movie list is resident to the distribution station. If so, process 700 proceeds to operation 714. However, if it is determined at operation 708 that one or more of the movie content from the list are not resident to the distribution station, process 700 proceeds to operation 710. Note that operation 708 can be implemented in diverse ways. For example, functionality associated the distribution station can perform the determination of operation 708 by utilizing and searching an electronic table (e.g., of movie titles) that includes the movie content currently resident to the distribution station.

At operation 710 of FIG. 7, a request can be output from the distribution station to one or more content centers (e.g., 104) for delivery of any movie content not resident to the distribution station. It is understood that operation 710 can be implemented in a wide variety of ways. For example, functionality associated with the distribution station can generate the request of operation 710 and cause it to be output by the distribution station to one or more content centers.

At operation 712, in response to receiving the movie request, each content center can download or transmit the requested movie content to the distribution station which can subsequently store it. Note that operation 712 can be implemented by utilizing, but is not limited to, method 900 or 1000 of FIGS. 9 and 10, respectively.

At operation 714 of FIG. 7, the customer (or consumer) is notified that the desired movie content is currently available at the selected distribution station. Note that operation 714 can be implemented in diverse ways. For example, at operation 714 functionality associated with the distribution station can send a notification message via e-mail to the customer. Alternatively, at operation 714 functionality associated with the distribution station can transmit a voice notification message to the customer via telephone and/or mobile phone technologies. Once operation 714 is completed, process 700 is exited. In this manner, when the customer subsequently arrives at the distribution station to rent and/or purchase the selected movie content, it will be available for him or her.

Figure 8:
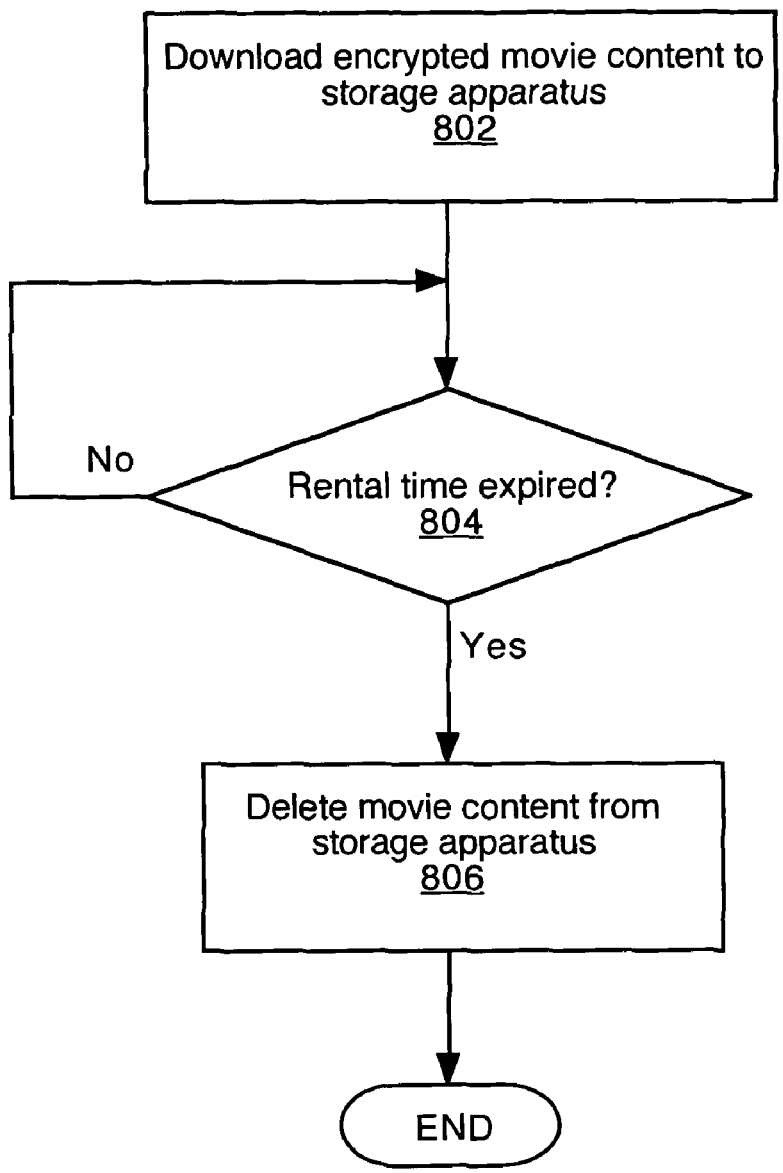
FIG. 8 is a flowchart of a method in accordance with embodiments of the present invention for enforcing a rental time period for downloaded movie content.

FIG. 8 is a flowchart of a method 800 in accordance with embodiments of the invention for enforcing a rental time period for downloaded movie content. Method 800 includes processes of embodiments of the invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 800, such operations are exemplary. That is, method 800 may not include all of the operations illustrated by FIG. 8. Alternatively, method 800 may include various other operations and/or variations of the operations shown by FIG. 8. It is noted that the operations of method 800 can each be performed by software, by firmware, by hardware or by any combination thereof.

Specifically, encrypted movie content (or its copy) can be downloaded to a certified storage apparatus as part of a movie rental transaction. A determination is made as to whether a defined rental time period for the downloaded movie has expired. If not, that determination is continually repeated until answered in the affirmative. However, if the defined rental time period for the downloaded movie has expired, the movie can be deleted from the storage apparatus. In this manner, method 800 enforces a defined rental time period for downloaded movie content in accordance with embodiments of the invention.

At operation 802 of FIG. 8, encrypted movie content (e.g., 114) or a copy of it can be downloaded or transmitted to a certified storage apparatus (e.g., 112) where it can be stored as part of a movie rental transaction. Note that the storage apparatus can be certified in a wide variety of ways. For example, the storage apparatus can be certified in any manner similar to that described herein, but is not limited to such. Note that the storage apparatus can be implemented in any manner similar to that described herein, but is not limited to such. As part of the downloading process at operation 802, the movie content can include an electronic identifier (or flag) indicating it is a rental movie. Furthermore, the rental movie can also be electronically time stamped with the date and time of the movie download. As such, the electronic rental identifier and time stamp can be utilized to enforce a predefined time period associated with the movie content rental transaction. It is appreciated that operation 802 can also be implemented by utilizing methods 500, 900, and/or 1000 of FIGS. 5, 9, and 10, respectively.

At operation 804, a determination can be made as to whether a predefined time period for the downloaded rental movie content has expired. If not, process 800 proceeds to the beginning of operation 804. However, if the predefined time period for the rental movie content has expired, process 800 proceeds to operation 806. It is appreciated that operation 804 can be implemented in diverse ways. For example, a security functionality (e.g., 116) associated with the storage apparatus can perform the determination of operation 804 by utilizing the electronic rental identifier and time stamp associated with the rental movie. Specifically, the security functionality may identify rental movie content by searching the storage apparatus for movie content that includes the previously mentioned electronic rental identifier. Once rental movie content is identified, the security functionality may compare its electronic time stamp with the current date and time to determine whether the predefined time period has expired for the rental movie content.

At operation 806, the rental movie content can be deleted from the storage apparatus. Note that operation 806 can be implemented in a wide variety of ways. For example, the rental movie content can be deleted from the storage apparatus by overwriting its associated electronic data with random and/or uniform electronic data. Alternatively, the rental movie content can be "deleted" from the storage apparatus by manipulating its corresponding electronic data in a manner that renders the rental movie content severely distorted and/or unusable. Once operation 806 is completed, process 800 is exited. In this manner, method 800 enforces a predefined rental time period for downloaded movie content in accordance with embodiments of the invention.

FIG. 9 is a flowchart of a method 900 in accordance with embodiments of the invention for providing encryption for streaming movie content. Method 900 includes processes of embodiments of the invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 900, such operations are exemplary. That is, method 900 may not include all of the operations illustrated by FIG. 9. Alternatively, method 900 may include various other operations and/or variations of the operations shown by FIG. 9. It is noted that the operations of method 900 can each be performed by software, by firmware, by hardware or by any combination thereof.

Specifically, a determination is made as to whether a source has received a device-key from a client device. If not, that determination is continually repeated until answered in the affirmative. However, if it is determined that the source has received a device-key, an encrypted content-key resident to the source can be decrypted using a public-key. The content-key can then be encrypted using the received device-key. Then the newly encrypted content-key can be transmitted to the client device. Upon reception of the encrypted content-key, the client can decrypt it using the device-key. The decrypted content-key can then be used by the client to decrypt encrypted streaming movie content output by the source. In this manner, method 900 provides encryption for streaming movie content.

At operation 902 of FIG. 9, a determination is made as to whether a source (e.g., 104) has received a device-key from a client device (e.g., 112). If not, process 900 proceeds to the beginning of operation 902 in order to repeat it. However, if it is determined at operation 902 that the source has received a device-key from a client device, process 900 proceeds to operation 904. It is appreciated that the device-key can be implemented in a wide variety of ways. For example, the device-key can be a unique identification associated with client device such as, but not limited to, a unique serial number associated with a processor of the client device. Note that the client device may transmit the device-key to the source as part of a request for delivery of streaming movie content. The client can be coupled with the source utilizing one or more communication networks (e.g., 110).

At operation 904, an encrypted content-key resident to the source can be decrypted using a public-key. Note that the content-key is encrypted on the source in order to keep it more secure. It is understood that the encryption of the content-key with the public-key can be implemented in diverse ways. For example, the encryption technique of the content-key can utilizes any encryption technique. Furthermore, as part of the encryption technique, the MD5 algorithm can be utilized on the content-key.

At operation 906 of FIG. 9, once the content-key has been decrypted, the content-key can then be encrypted using the received device-key. It is appreciated that any encryption technique can be utilized at operation 906 in order to encrypt the content-key utilizing the device-key.

At operation 908, the newly encrypted content-key can be transmitted (or output) by the source to the client device. It is understood that operation 908 can be implemented in a wide variety of ways. For example, the source can output the encrypted content-key to the client device via one or more communication networks (e.g., 110), but is not limited to such.

At operation 910 of FIG. 9, the client receives the encrypted content-key and then can decrypt it utilizing a copy of the device-key resident to the client. It is appreciated that prior to operation 902, the client device may have stored the copy of the device-key before outputting the device-key to the source.

At operation 912, the client can utilize the decrypted content-key to decrypt encrypted streaming movie content that can subsequently be output or transmitted by the source to the client. It is understood that the streaming movie content can be encrypted by the source utilizing the content-key. Once operation 912 is completed, process 900 can be exited.

FIG. 10 is a flowchart of a method 1000 in accordance with embodiments of the invention for providing encryption for downloaded movie content. Method 1000 includes processes of embodiments of the invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in method 1000, such operations are exemplary. That is, method 1000 may not include all of the operations illustrated by FIG. 10. Alternatively, method 1000 may include various other operations and/or variations of the operations shown by FIG. 10. It is noted that the operations of method 1000 can each be performed by software, by firmware, by hardware or by any combination thereof.

Specifically, a determination is made as to whether a source has received a device-key from a client device. If not, that determination is continually repeated until answered in the affirmative. However, if it is determined that the source has received a device-key, an encrypted content-key resident to the source can be decrypted using a public-key. The content-key can then be encrypted using the received device-key. The newly encrypted content-key can then be stored by the source as the new content-key for future encryption of movie content. The source can then transmit the newly encrypted content-key and its associated encrypted movie content to the client. Upon reception of the encrypted content-key, the client can decrypt it using the device-key. The decrypted content-key can then be used by the client to decrypt its associated encrypted movie content. In this manner, method 1000 provides encryption for downloaded movie content.

Note that operations 902, 904, and 906 of FIG. 10 can be implemented in any manner similar to operations 902, 904, and 906 of FIG. 9, as described herein. As shown in FIG. 10, once operation 906 is completed, method 1000 can proceed to operation 1002.

At operation 1002, the newly encrypted content-key can then be stored by the source (e.g., 104) as its new content-key for future encryption of movie content. In this manner, the content-key can be more secure since it can be ever changing or dynamic instead of remaining fixed. However, it is understood that operation 1002 may be an optional operation of process 1000.

At operation 1004 of FIG. 10, the source can transmit (or output) the newly encrypted content-key and its associated encrypted movie content to the client. It is appreciated that operation 1004 can be implemented in a wide variety of ways. For example, the source can output the encrypted content-key and its associated encrypted movie content to the client device via one or more communication networks (e.g., 110), but is not limited to such.

At operation 1006, the client receives the encrypted content-key (along with its associated encrypted movie content) and then can decrypt the content-key utilizing a copy of the device-key resident to the client. It is understood that prior to operation 902 of FIG. 10, the client device may have stored the copy of the device-key before outputting the device-key to the source.

At operation 1008 of FIG. 10, the decrypted content-key can be utilized by the client in order to decrypt its associated encrypted movie content. Once operation 1008 is completed, process 1000 can be exited.

Embodiments in accordance with the invention can be formed by any combination of methods 500, 600, 700, 800, 900, and 1000. Furthermore, two or more operations of methods 500, 600, 700, 800, 900, and 1000 can be combined to form an embodiment in accordance with the invention.

Figure 11:
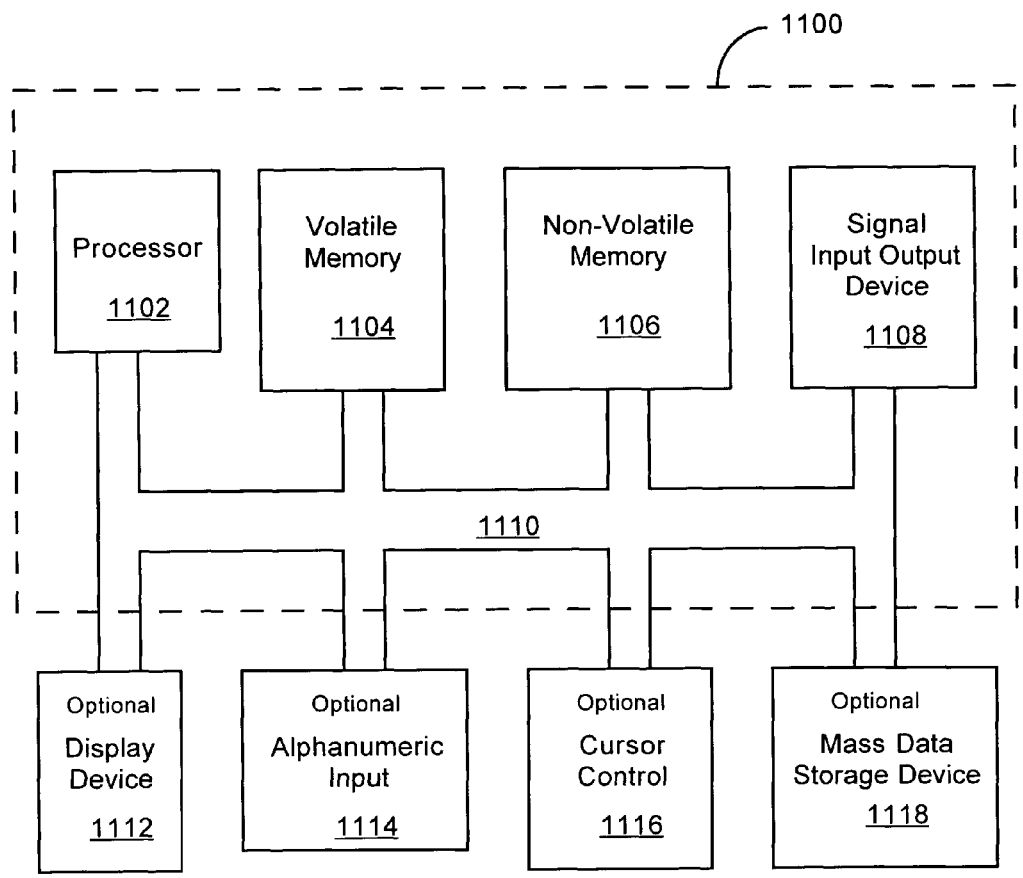
FIG. 11 is a block diagram of an exemplary computer system that can be used in accordance with embodiments of the present invention.

FIG. 11 is a block diagram of an exemplary computer system 1100 that can be used in accordance with embodiments of the present invention. It is understood that system 1100 is not strictly limited to be a computer system. As such, system 1100 of the present embodiment is well suited to be any type of computing device (e.g., server computer, desktop computer, laptop computer, portable computing device, database computer, and the like). Note that computer system 1100 can be utilize to implement any type of computing device mentioned herein with reference to embodiments in accordance with the invention. In its various implementations, system 1100 may not include all of the elements illustrated by FIG. 11, or system 1100 may include other elements not shown by FIG. 11. Within the discussions of embodiments in accordance with the invention herein, certain processes and operations were discussed that may be realized, in some embodiments, as a series of instructions (e.g., software program) that reside within computer readable memory of computer system 1100 and executed by a processor(s) of system 1100. When executed, the instructions can cause computer 1100 to perform specific operations and exhibit specific behavior which are described herein.

Computer system 1100 comprises an address/data bus 1110 for communicating information, one or more central processors 1102 coupled with bus 1110 for processing information and instructions. Central processor unit(s) 1102 may be a microprocessor or any other type of processor. The computer 1100 also includes data storage features such as computer usable volatile memory 1104, e.g., random access memory (RAM), static RAM, dynamic RAM, etc., coupled with bus 1110 for storing information and instructions for central processor(s) 1102, computer usable non-volatile memory 1106, e.g., read only memory (ROM), programmable ROM, flash memory, erasable programmable read only memory (EPROM), electrically erasable programmable read only memory (EEPROM), etc., coupled with bus 1110 for storing static information and instructions for processor(s) 1102.

System 1100 of FIG. 11 also includes one or more signal generating and receiving devices 1108 coupled with bus 1110 for enabling system 1100 to interface with other electronic devices. The communication interface(s) 1108 of the present embodiment can include one or more wired and/or wireless communication technologies. For example, in one embodiment of the present invention, the communication interface 1108 is a serial communication port, but could also alternatively be any of a number of well known communication standards and protocols, e.g., a Universal Serial Bus (USB), an Ethernet adapter, a FireWire (IEEE 13114) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case, the communication interface(s) 1108 may include a cable modem or a DSL modem.

Optionally, computer system 1100 can include an alphanumeric input device 1114 including alphanumeric and function keys coupled to the bus 1110 for communicating information and command selections to the central processor(s) 1102. The computer 1100 can also include an optional cursor control or cursor directing device 1116 coupled to the bus 1110 for communicating user input information and command selections to the processor(s) 1102. The cursor directing device 1116 can be implemented using a number of well known devices such as, but not limited to, a mouse, a track ball, a track pad, an optical tracking device, a touch screen, etc. Alternatively, it is appreciated that a cursor can be directed and/or activated via input from the alphanumeric input device 1114 using special keys and key sequence commands. The present embodiment is also well suited to directing a cursor by other means such as, for example, voice commands.

The system 1100 of FIG. 11 can also include an optional computer usable mass data storage device 1118 such as a magnetic or optical disk and disk drive (e.g., hard drive or floppy diskette) coupled with bus 1110 for storing information and instructions. An optional display device 1112 is coupled to bus 1110 of system 1100 for displaying video and/or graphics. It should be appreciated that optional display device 1112 can be a cathode ray tube (CRT), flat panel liquid crystal display (LCD), field emission display (FED), plasma display or any other display device suitable for displaying video and/or graphic images and alphanumeric characters recognizable to a user.

The components associated with system 1100 described above may be resident to and associated with one physical computing device. However, one or more of the components associated with system 1100 may be physically distributed to other locations and be communicatively coupled together (e.g., via a network).

It is noted that embodiments in accordance with the invention have been described with reference to movies and/or movie content. However, embodiments in accordance with the invention are not limited to such. Instead, embodiments in accordance with the invention can operate with any type media content such as, but not limited to, video content, graphics content, audio content, multimedia content, text, documents, software, software update or upgrade, application software, software in accordance with one or more embodiments of the invention, and the like.

The foregoing descriptions of specific embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
    enabling generation of a list of media content via a web site;
    enabling selection of a kiosk distribution station via said web site;
    transmitting said list to said kiosk distribution station;
    said kiosk distribution station transmitting a notification that said media content of said list is available at said kiosk distribution station;
    storing media content with said kiosk distribution station;
    encrypting said media content;
    determining if a portable storage apparatus is coupled with said kiosk distribution station;
    after said portable storage apparatus is coupled with said kiosk distribution station, said kiosk distribution station determining if said portable storage apparatus is authorized to receive said media content;
    after said portable storage apparatus is authorized to receive said media content, said kiosk distribution station downloading encrypted media content to said portable storage apparatus; and
    displaying a media content recommendation list with said kiosk distribution station.

2. The method of claim 1, further comprising:
    when said portable storage apparatus is not authorized to receive said media content, said kiosk distribution station determining if said portable storage apparatus can become authorized to receive said media content.

3. The method of claim 2, further comprising:
    when said portable storage apparatus can become authorized to receive said media content, said kiosk distribution station authorizing said portable storage apparatus to receive said media content.

4. The method of claim 1, further comprising:
    said kiosk distribution station determining if said media content of said list is resident to said kiosk distribution station.

5. The method of claim 4, further comprising:
    said kiosk distribution station requesting said media content of said list that is not resident to said kiosk distribution station.

6. The method of claim 1, wherein said determining if said portable storage apparatus is authorized comprises said kiosk distribution station determining if said portable storage apparatus includes a security functionality.

7. The method of claim 6, wherein said security functionality restricts transfer of said media content to a device that does not include a copy of said security functionality.

8. The method of claim 6, wherein said security functionality enforces rental time period of said downloaded encrypted media content.

9. The method of claim 1, wherein said kiosk distribution station is a free standing kiosk that comprises a computing device coupled to the Internet.

10. A method comprising:
    enabling generation of a list of media content via a web site;
    enabling selection of a kiosk distribution station via said web site;
    transmitting said list to said kiosk distribution station;

said kiosk distribution station transmitting a notification that said media content of said list is available at said kiosk distribution station;
said kiosk distribution station receiving media content from a central system;
said kiosk distribution station determining whether a portable electronic storage apparatus is coupled to said kiosk distribution station;
after said portable electronic storage apparatus is coupled to said kiosk distribution station, a security functionality of said kiosk distribution station determining whether said portable electronic storage apparatus is authorized to receive said media content;
after said portable electronic storage apparatus is authorized to receive said media content, said kiosk distribution station downloading encrypted media content to said portable electronic storage apparatus; and
said kiosk distribution station displaying a media content recommendation list.

11. The method of claim 10, wherein said kiosk distribution station receiving said media content from said central system is via the Internet.

12. The method of claim 10, further comprising:
said kiosk distribution station determining if said media content of said list is resident to said kiosk distribution station.

13. The method of claim 12, further comprising:
said kiosk distribution station requesting said media content of said list that is not resident to said kiosk distribution station.

14. The method of claim 10, wherein said security functionality software performs said determining whether said portable electronic storage apparatus is coupled to said kiosk distribution station.

15. The method of claim 10, further comprising:
said security functionality software disallowing download of said media content to said portable electronic storage apparatus when said portable electronic storage apparatus does not include a copy of said security functionality software.

16. The method of claim 10, further comprising:
when said portable electronic storage apparatus is authorized to receive said media content, said security functionality allowing download of encrypted media content to said portable electronic storage apparatus from said kiosk distribution station.

17. The method of claim 10, wherein said transmitting said notification comprises utilizing electronic mail.

18. The method of claim 17, wherein said transmitting said notification comprises utilizing mobile phone technology.

19. A computer-usable medium having computer-readable code embodied therein for causing a kiosk distribution station to perform a method comprising:
said kiosk distribution station receiving a list of media content that was generated via a web site, wherein said kiosk distribution station was an option of a directory of said web site;
said kiosk distribution station requesting said media content of said list that is not resident to said kiosk distribution station;
said kiosk distribution station transmitting a notification that said media content of said list is available at said kiosk distribution station;
determining whether a portable storage apparatus is coupled with said kiosk distribution station;
after said portable storage apparatus is coupled with said kiosk distribution station, said kiosk distribution station determining whether said portable storage apparatus is authorized to receive media content;
when said portable storage apparatus is authorized to receive said media content, said kiosk distribution station downloading encrypted media content to said portable storage apparatus; and
said kiosk distribution station displaying a media content recommendation list.

20. The computer-usable medium of claim 19, wherein said method further comprising:
when said portable storage apparatus is not authorized to receive said media content, said kiosk distribution station determining whether said portable storage apparatus can become authorized to receive said media content.

21. The computer-usable medium of claim 20, further comprising:
when said portable storage apparatus can become authorized to receive said media content, said kiosk distribution station authorizing said portable storage apparatus to receive said media content by downloading a security functionality software.

22. The computer-usable medium of claim 21, wherein said security functionality software restricts transfer of said media content to a device that does not include a copy of said security functionality software.

23. The computer-usable medium of claim 19, wherein said transmitting said notification comprises utilizing electronic mail.

24. The computer-usable medium of claim 19, wherein said kiosk distribution station transmitting said notification comprises utilizing a telephone technology.

* * * * *